March 26, 1968  H. DAVID ET AL  3,374,905
METHOD AND APPARATUS FOR TRANSPORTING RECEPTACLES
Filed Oct. 22, 1965  6 Sheets-Sheet 1
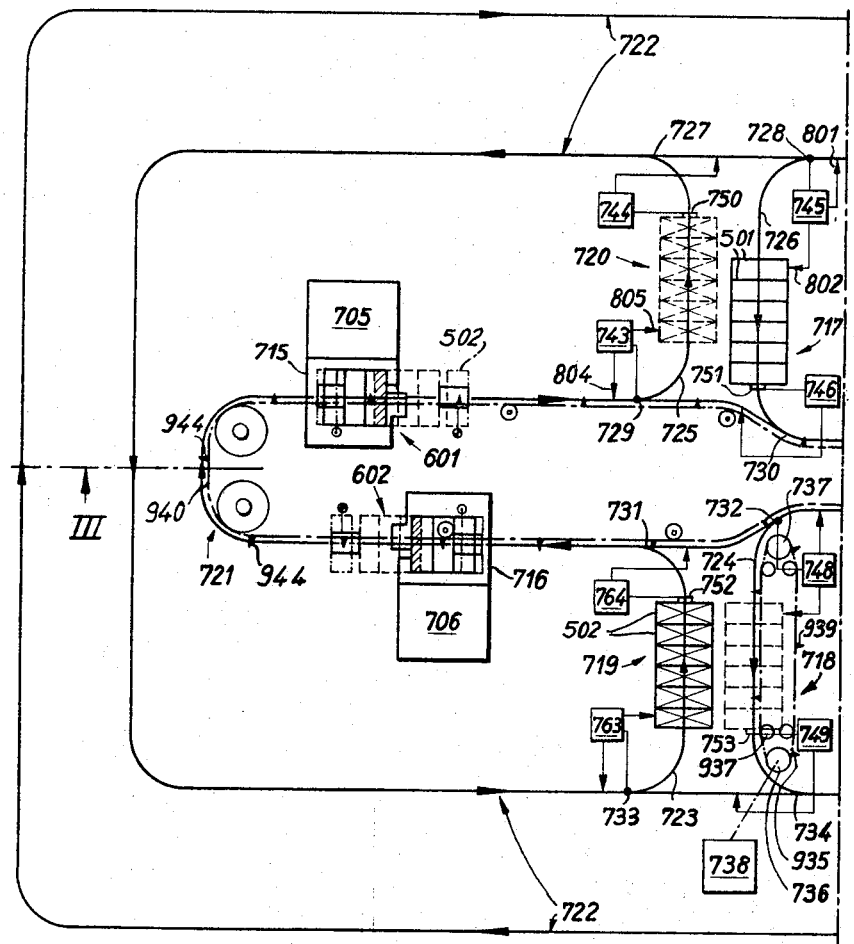
Fig.1a
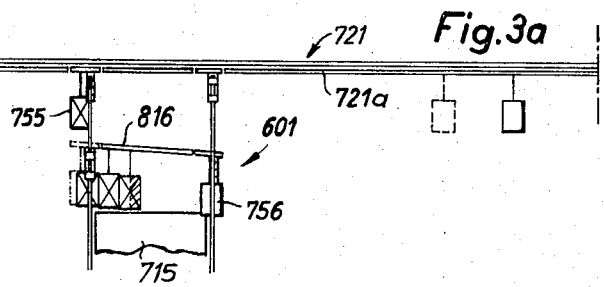
Fig.3a
| Fig.1a | Fig.1b |
|---|---|
Fig.1
| Fig.3a | Fig.3b |
|---|---|
Fig.3
Inventors
Henri David, Otto Erdmann
Hans Jähns, Willi Rüdiger
by Michael S. Striker
Attorney March 26, 1968     H. DAVID ET AL     3,374,905
METHOD AND APPARATUS FOR TRANSPORTING RECEPTACLES
Filed Oct. 22, 1965     6 Sheets-Sheet 2
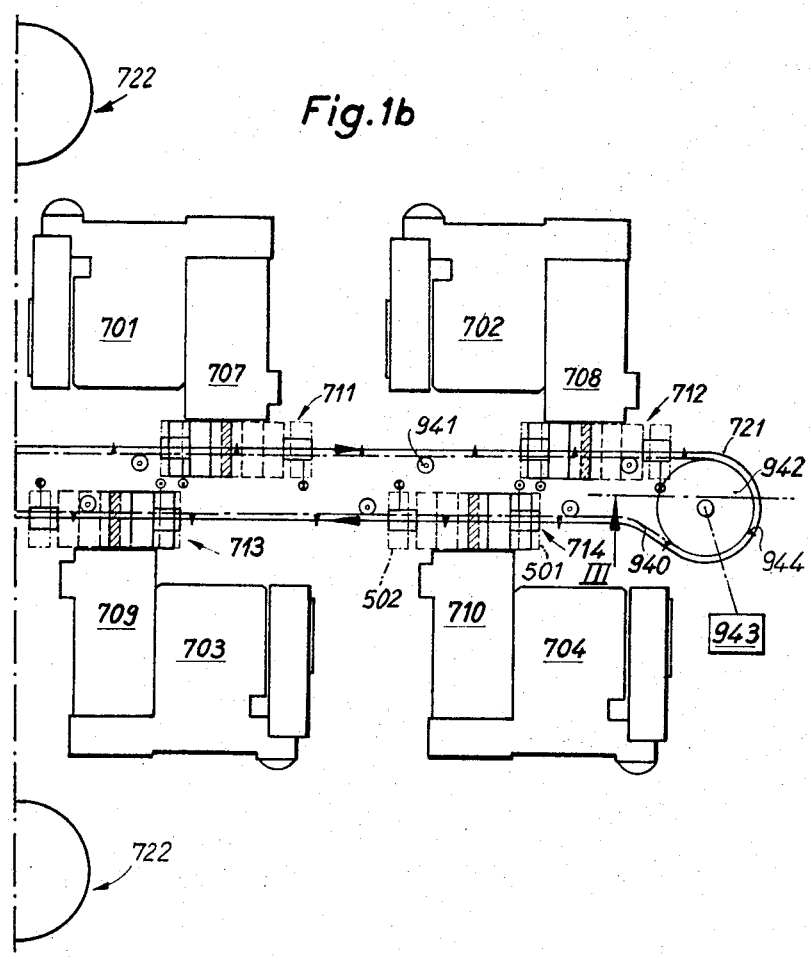
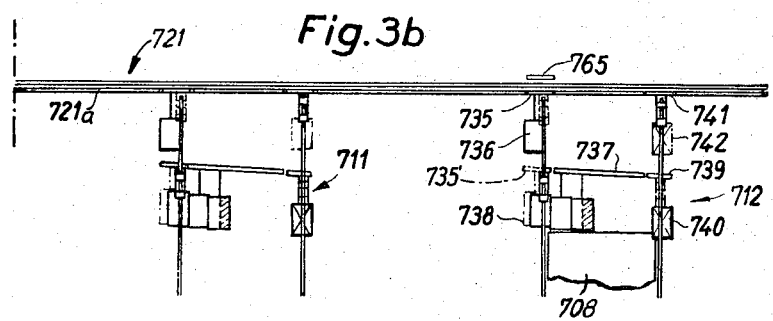

March 26, 1968 H. DAVID ET AL 3,374,905
METHOD AND APPARATUS FOR TRANSPORTING RECEPTACLES
Filed Oct. 22, 1965 6 Sheets-Sheet 3

Inventors

March 26, 1968   H. DAVID ETAL   3,374,905
METHOD AND APPARATUS FOR TRANSPORTING RECEPTACLES
Filed Oct. 22, 1965                         6 Sheets-Sheet 3
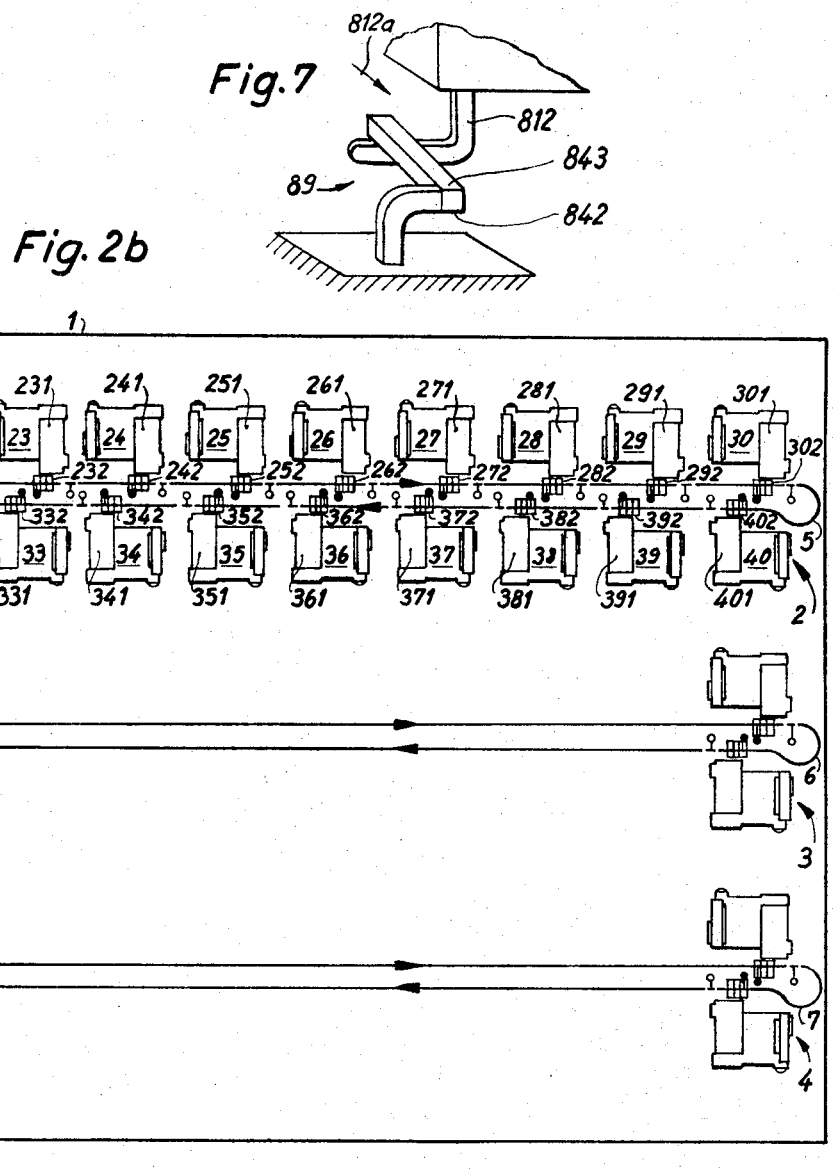
Inventors

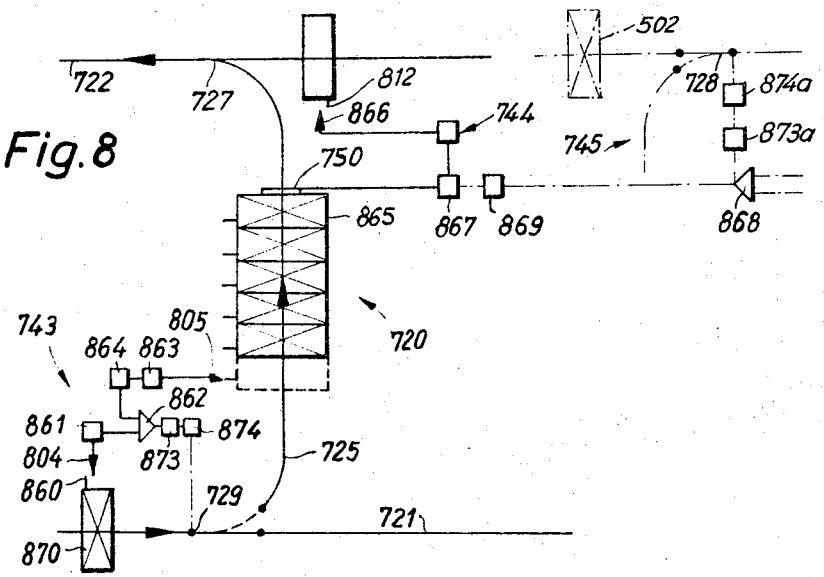
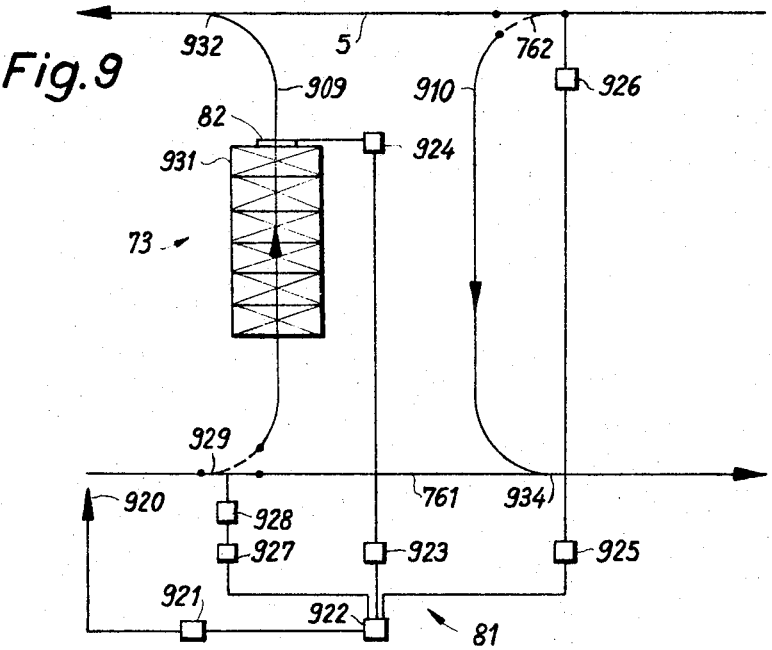

United States Patent Office 3,374,905
Patented Mar. 26, 1968

3,374,905
METHOD AND APPARATUS FOR
TRANSPORTING RECEPTACLES
Harri David, Hamburg-Lohbrugge, Otto Erdmann, Hamburg-Bergedorf, Claus Jahnig, Hamburg, and Willy Rudszinat, Dassendorf, near Hamburg, Germany, assignors to Hauni-Werke Korber & Co., KG., Hamburg-Bergedorf, Germany
Filed Oct. 22, 1965, Ser. No. 500,988
Claims priority, application Great Britain,
Oct. 22, 1964, 43,111/64
21 Claims. (Cl. 214—16)

ABSTRACT OF THE DISCLOSURE

Cigarettes produced by a first battery of machines are loaded into trays which are circulated by an endless feed conveyor extending along a second battery of machines which convert filled trays into empty trays. Surplus trays (including filled and empty trays) are circulated by the feed conveyor and by a second endless conveyor. Rows of empty and filled trays are accumulated in magazines disposed between the two conveyors and two sets of storing conveyors are provided, one for each magazine, to transfer empty and filled trays unidirectionally through the respective magazines from one of the conveyors to the other conveyor and to transfer empty and filled trays from the other conveyor to the one conveyor.

The present invention relates to a method and apparatus for transporting receptacles, and more particularly to a method and apparatus for transporting receptacles which contain stacks or batches of cigarettes, filter cigarettes, cigars, filter cigars, cigarillos, cheroots, filter mouthpieces, filter rods, tobacco rods, measured quantities of pipe tobacco or chewing tobacco, or other smokers' articles. Still more particularly, the invention relates to a method and apparatus for circulating receptacles in a production line wherein a first class of machinery converts empty receptacles into filled receptacles and a second class of machinery reconverts filled receptacles into empty receptacles.

In modern tobacco processing plants, large numbers of fully automatic or semiautomatic producing and processing or consuming machines are assembled into production lines. For example, a production line may comprise a large number of cigarette machines or filter cigarette machines and a requisite number of packing machines. Alternatively, the production line may comprise a certain number of packing machines and a requisite number of wrapping machines wherein packs of cigarettes or other smokers' articles are provided with wrappers of cellophane or other suitable wrapping material. The output of such wrapping machines may be conveyed to binding machines which assemble wrapped packs into bunches, and such binding machines may be followed by additional packing machines wherein properly tied bundles of wrapped packs are inserted into boxes or other forms of large containers which are ready for shipment to storage or to the distributor. A production line may also comprise one or more rod cigarette machines wherein cigarette rods turned out by the rod cigarette machines are assembled with filter mouthpieces to form filter cigarettes of unit length or multiple unit length.

In such production lines, it is desirable to provide a reserve or surplus of goods so that the consuming machine or machines may continue to operate even if one or more producing machines are operated at less than full capacity. Thus, and in the absence of a surplus on goods, the consuming machines must be operated at less than full speed as soon as a single producing machine happens to require repair, inspection or is shut down for another unforeseen reason. The surplus is used up at the time when the class of machinery which includes one or more producing machines operates at less than maximum capacity.

It is already known to assemble a cigarette machine and a packing machine into a production line and to provide the production line with a conveyor which feeds the goods from the cigarette machine to the packing machine. The effective length of the conveyor may be increased or reduced so that the conveyor may accumulate a certain surplus which is used up by the packing machine in the event that the cigarette machine is idle or operates at less than full speed. The storing capacity of the conveyor is rather small so that the packing machine must be arrested, or its speed reduced, shortly after the cigarette machine is brought to a standstill.

In accordance with another prior proposal, two cigarette machines are combined with a packing machine, and the conveyor which transports goods from the cigarette machines to the packing machine comprises conventional trays which are transported by endless bands. A first endless band transports filled trays to the packing machine and a second endless band transports empty trays back to the cigarette machines. Filled trays which constitute a surplus are sidetracked from the conveyor in a first direction and, when needed, such filled trays are withdrawn from storage in the opposite direction. A serious drawback of such production lines is that certain filled trays remain in storage for very long periods of time, particularly when the cigarette machines and the packing machine operate at full capacity, so that the goods which are accommodated in the thus stored trays may be affected by contact with atmospheric air. For example, freshly produced cigarettes should be packed as soon as possible because the tobacco is likely to lose moisture.

Accordingly, it is an important object of the present invention to provide a novel method of operating a production line wherein large quantities of smokers' articles and other types of sensitive goods are produced by a first class of machinery and are thereupon processed in a second class of machinery.

Another object of the invention is to provide a novel method of starting and a novel method of shutting down a production line for cigarettes or other smokers' articles.

A further object of the invention is to provide a method of the above outlined characteristics according to which the goods are processed or consumed in the same sequence (or substantially in the same sequence) in which they are turned out by the producing machine or machines.

An additional object of the invention is to provide a novel method of regulating the circulation of surplus goods in a production line of the above outlined characteristics.

Still another object of the invention is to provide a novel apparatus wihch may constitute a production line for cigarettes, cigars or other smokers' articles and wherein partial or complete shutdown of one or more producing or consuming machines cannot affect the operation of the remaining producing or consuming machines.

Another object of the instant invention is to provide a production line wherein the circulation of freshly produced goods is controlled in a fully automatic way, wherein the conveyor system may carry a surplus which meets the requirements of producing machines for a desired period of time, even at times when all of the consuming machines operate at full capacity, and wherein each producing and each consuming machine is supplied with empty or filled receptacles at the exact rate at which such receptacles are needed in accordance with the momentary output of the respective machines.

A concomitant object of the invention is to provide a novel conveyor system which may be utilized in an apparatus of the above outlined characteristics.

A further object of the invention is to provide a novel system of magazines for use in an apparatus of the above identified type.

Still another object of the invention is to provide a production line which exhibits the above outlined features and advantages and which may be composed of two or more groups each of which includes producing and consuming machines and wherein each consuming machine may constitute the producing machine of a further production line.

Another object of the invention is to provide a production line wherein two or more brands of goods, turned out by two or more types of producing machines, may be fed to two or more types of consuming machines.

A further object of the invention is to provide an apparatus which is particularly suited for mass production and processing of cigarettes, cigars and similar rod-shaped smokers' articles and wherein the articles are automatically processed (for example, packed) in the same or in nearly the same sequence in which they are removed from the producing machines so that the exposure to atmospheric air effects all goods to the same extent.

Another object of the invention is to provide a production line which, in normal operation, automatically accumulates a certain surplus of goods which can be used up when one or more producing machines happen to require repair or are shut down for another reason.

Briefly stated, one feature of our present invention resides in the provision of an apparatus for supplying smokers' products or other types of mass-produced goods from a first class of machinery which preferably includes a plurality of producing machines to a second class of machinery which preferably includes several consuming machines. The apparatus comprises a feed conveyor which defines an endless path extending along the producing and consuming machines so that goods produced by the first class of machinery are transported in and are thereupon withdrawn from the endless path by the machinery of the second class at a rate depending on the output of the consuming machines, an auxiliary conveyor which defines a second path, at least one magazine for surplus goods, and an intermediate conveyor for unidirectionally transporting surplus goods from one of the paths, through the magazine, and into the other path. As a rule, the conveyor system will comprise several intermediate conveyors which connect the two paths in such a way that goods located in the first or in the second path may be rapidly transferred to one of the consuming machines.

In accordance with another feature of our invention, the apparatus constitutes a production line for smokers' articles or other types of goods wherein receptacles are circulated between first and second classes of machines in one of which empty receptacles receive predetermined quantities of goods and are thus converted into filled receptacles, and in the other of which filled receptacles are relieved of goods and are thus reconverted into empty receptacles. The just outlined production line can be operated by resorting to a method which comprises the steps of circulating a first supply of filled and empty receptacles in a first endless path which extends along the machines, diverting from the endless path filled and empty receptacles at a rate depending on the output of the respective machines and delivering the thus diverted receptacles to the machines requiring them, returning converted receptacles into the endless path, circulating a second supply of filled and empty receptacles in a second endless path, accumulating separate rows of filled and empty receptacles in magazines which are disposed between the two paths, unidirectionally transferring receptacles from one of the paths to the rows of stored receptacles, and unidirectionally transferring receptacles from such stored rows into the other path, always in such a way that the filled receptacles are fed to consuming machines in the same sequence in which they are filled in the producing machines.

In accordance with a further feature of our invention, the production line may be shut down in two stages in the first of which the producing machines are stopped while the consuming machines continue to operate so that they use up all of the stored goods before the entire production line is brought to a standstill. Inversely, when the production line is to be started, the producing machines are started ahead of the consuming machines so that the conveyor system can accumulate a supply of filled receptacles. The consuming machines are started at a time when the conveyor system accommodates such a number of filled receptacles that each producing machine can begin to operate at full capacity.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 (composed of FIGS. 1a and 1b) is a diagrammatic top plan view of an apparatus which embodies one form of our invention and which comprises four producing and two consuming machines;

FIG. 3 (composed of FIGS. 3a and 3b) is an enlarged view as seen in the direction of arrows from the line III—III of FIG. 1;

FIG. 4 is an enlarged view of a detail of the structure shown in FIG. 3a;

FIG. 7 is an enlarged fragmentary perspective view of a detail of the structure shown in FIG. 5;

FIG. 8 is an enlarged view of a detail of the structure shown in FIG. 1a; and

FIG. 9 is an enlarged view of a detail of the structure shown in FIG. 2a.

Figure 2:
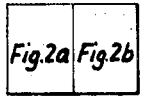
FIG. 2 (composed of FIGS. 2a and 2b) is a diagrammatic top plan view of a second apparatus which comprises three groups of producing and consuming machines.

Referring first to FIGS. 1a and 1b, there is shown an apparatus which constitutes a production line and is utilized for supplying specially constructed and dimensioned receptacles 501, 502 (hereinafter called cages for short) to two classes of machinery. One class of machinery includes four producing machines 701, 702, 703, 704 each of which is assumed to constitute a cigarette machine or a filter cigarette machine. The other class of machinery includes two consuming machines 705, 706 each of which is assumed to constitute a packing machine of the type which, in a normal operation, is capable of using up the output of two cigarette machines. The machines 701–706 are adjacent to an endless path defined by a main conveyor or feed conveyor 721.

Each of the cigarette machines 701–704 may be of known construction and comprises a tray filling unit 707–710, respectively, where empty trays are replaced with filled trays. The aforementioned cages 501, 502 are arranged to circulate trays in the endless path defined by the feed conveyor 721, and the conversion of cages in the machines 701–704 consists in that a cage which contains one or more empty trays is converted into a cage accommodating one or more filled trays. The apparatus further comprises a series of so-called diverting conveyors 711–714 which may be of the type as disclosed in our copending application Ser. No. 501,775 filed Oct. 22, 1965 and now abandoned, and whose purpose is to withdraw empty cages from the endless path defined by the feed conveyor 721, to advance such empty cages to one of the filling units 707–710 at a rate determined by the momentary output of the machines 701–704, and to return filled cages into the aforementioned endless path. In other words, the feed conveyor 721 circulates a supply of filled and empty cages 502, 501 and, when an empty cage 501 is required by one of the cigarette machines 701–704, the corresponding diverting conveyor 711, 712, 713 or 714 withdraws an empty cage 501 from the feed conveyor 721 and advances the thus withdrawn empty cage to the corresponding filling unit 707, 708, 709 or 710 for conversion into a filled cage 502 which is thereupon returned onto the feed conveyor 721 for renewed circulation in the endless path. In the illustrated embodiment, the diverting conveyors 710–714 are located at a level below the feed conveyor 721 so that a diverted empty cage 501 first travels downwardly to the level of the corresponding filling unit, thereupon substantially horizontally through or along and past such filling unit, and finally upwardly back into the endless path. In other words, each diverting conveyor defines a substantially U-shaped path in the horizontal section of which empty cages 501 are converted into filled cages 502. Such U-shaped paths are clearly shown in FIG. 3b. The trays which are carried by the empty and filled cages may be of the type as disclosed, for example, in U.S. Patent No. 3,190,459 to Kochalski et al., granted June 22, 1965. Also, the filling units 707–710 may be constructed and assembled in a manner as disclosed in this patent. At least one side of each tray is open so that the tray may receive rows or groups of cigarettes which are stacked on top of each order until the tray is filled. Such filled tray then replaces in empty tray carried by that empty cage 501 which has been delivered by the corresponding diverting conveyor.

The packing machines 705, 706 respectively comprise evacuating units 715, 716 which receive filled cages 502 from two additional diverting conveyors 601, 602, respectively. The construction of the diverting conveyors 601, 602 is substantially the same as that of the diverting conveyors 711–714 with the important exception that the conveyors 601, 602 withdraw from the endless path only filled cages 502 but allow empty cages 501 to bypass the corresponding packing machines. The construction of the diverting conveyor 601 is shown in FIG. 3a, and it will be seen that this diverting conveyor again defines a substantially U-shaped path. The purpose of the evacuating units 715, 716 is to convert filled cages 502 into empty cages 501, i.e., to remove filled trays from such cages 502 which were diverted by the conveyors 601, 602 and to replace each filled tray with an empty tray.

The numerals 719 and 720 denote two magazines each of which may accommodate a predetermined maximum number of filled cages 502, i.e., such cages which were converted in the cigarette machines 701–704.

The apparatus further comprises two magazines 717, 718 each of which can accommodate a predetermined maximum number of empty cages 501, namely, such cages which were converted in the packing machines 705, 706. A first storing or intermediate conveyor 726 extends through the magazine 717 and its inlet includes a switch 728 which may allow empty cages 501 to enter from an auxiliary conveyor 722 which latter defines a second endless path. The outlet 730 of the storing conveyor 726 merges into the adjacent portion of the feed conveyor 721. A second storing or intermediate conveyor 724 extends through the magazine 718 and has an inlet including a switch 732 adjacent to the endless path defined by the feed conveyor 721. The outlet 734 of the second storing conveyor 724 merges into the adjacent portion of the auxiliary conveyor 722. A third storing or intermediate conveyor 723 extends through the magazine 719 and its inlet includes a switch 733 which is adjacent to a portion of the auxiliary conveyor 722. The outlet 731 of the storing conveyor 723 merges into the adjacent portion of the feed conveyor 721. Finally, a fourth storing or intermediate conveyor 725 extends through the magazine 720 and its inlet comprises a switch 729 which is adjacent to a portion of the feed conveyor 721. The outlet 727 of the storing conveyor 725 merges into the adjacent portion of the auxiliary conveyor 722. The switches 728, 729, 732, 733 may be moved to and from operative positions. Thus, when the switch 729 is moved to operative position in which it merges into the adjacent portion of the feed conveyor 721, a filled cage 502 moving past and beyond (downstream of) the packing machine 705 may be sidetracked onto the storing conveyor 725 to enter the magazine 720. Also, if the switch 732 is moved to operative position so as to merge into the adjacent portion of the feed conveyor 721, an empty cage 501 which has moved past and beyond (downstream of) the cigarette machines 701–704 may be sidetracked onto the storing conveyor 724 to enter the magazine 718. The switches 728, 729, 732, 733 may be respectively shifted or activated by shifting devices or switch stands 745, 743, 748 and 763.

The outlets 730, 731, 734 and 727 are fixedly mounted and cannot be shifted. They invariably merge into the respective conveyors 721, 722 so that there is no way of preventing advance of a cage into the corresponding conveyor unless the cage is retained in one of the magazines 717–720. Each of these magazines is provided with an arresting or blocking device which prevents uncontrolled withdrawal of cages. The blocking devices 751, 753, 752 and 750 respectively control evacuation of cages from the magazines 717, 718, 719, 720. These blocking devices 750–753 are respectively controlled by actuating devices 744, 746, 764 and 749 whose function is to start the drives of the corresponding blocking devices so as to effect release of cages from the respective magazines. The operation of the actuating devices 744, 746, 749, 764 will be described in connection with FIG. 8.

The endless paths defined by the conveyors 721–726 are indicated schematically by solid lines which are provided with arrows to point out the directions in which the cages travel. Each of these conveyors comprises a fixed guide rail for the overhead carriages of cages 501, 502 and a driven chain which travels along the respective guide rail and is provided with motion transmitting projections or lugs serving to entrain or to push the carriages along the guide rail. The exact construction of a main or feed conveyor which may be used in the apparatus of the present invention is disclosed, for example, in our aforementioned copending application Ser. No. 501,775. This copending application also discloses the construction and configuration of cages 501, 502 and of trays which are transported by such cages.

The chains which cooperate with the guide rails of conveyors 721, 722 are endless chains extending all the way along the respective guide rails. FIGS. 1a and 1b show the endless chain 940 of the feed conveyor 721. This chain is trained around suitably distributed rollers and sprockets 941, 942 the latter of which is driven by a motor 943. Motion transmitting projections or lugs 944 serve to entrain or to push the cages 501, 502 when the motor 943 is started. The endless chain 935 which cooperates with the guide rail of the storing conveyor 724 is shown in FIG. 1a. This chain 935 comprises a plurality of elastically deformable or spring-biased motion transmitting projections or lugs 939 and is trained around sprockets 736, 737. A motor 738 drives the chain 935 at a constant speed. The lugs 939 tend at all times to entrain the carriages of empty cages 501 in the magazine 718, but the cages will advance only when the corresponding blocking device 753 allows the foremost cage to leave the magazine 718 and to advance to and beyond the outlet 734 and onto the auxiliary conveyor 722. An empty cage which has been sidetracked by the switch 732 will be engaged by the nearest lug 939 of the chain 935 and will be caused to enter the magazine 718 where it constitutes the rearmost cage. Thus, when the blocking device 753 is operative and prevents evacuation of empty cages 501 from the magazine 718, the latter accommodates a row containing a predetermined number of closely adjacent empty cages and the lugs 939 of the chain 935 are deformed or yield in response to engagement with the carriage of each empty cage in the magazine 718. When the actuating device 749 starts the drive which causes the blocking device 753 to release the foremost empty cage 501 from the magazine 718, the remaining cages in this magazine automatically advance by a step so that the foremost remaining empty cage moves into abutment with the arresting device 753. The signals transmitted by the actuating device 749 are such that the blocking device 753 invariably releases a single empty cage 501 at a time. The numeral 937 indicates one of several deflecting rollers for the endless chain 935.

The chains which transport cages through the magazines 717, 719, 720 are of the same construction as the chain 935. The motion transmitting lugs 939 and 944 are equidistant from each other. The guide rails of the conveyors 721–726 are preferably mounted in a common horizontal plane and at such a level above the floor that a person can stand below the cages 501, 502 which are being transported or circulated by such conveyors.

FIGS. 3a and 3b illustrate the guide rail 721a of the feed conveyor 721 in a side elevational view. The chain 740 has been omitted for the sake of clarity. Each of the diverting conveyors 601, 711, 712 shown in FIGS. 3a and 3b can move an empty cage or a filled cage to the respective converting station and thereupon returns a converted cage back to the feed conveyor 721. FIG. 3a shows, by way of example, a filled cage 755 on its way to the evacuating unit 715 of the packing machine 705 and an empty (converted) cage 756 on its way from the evacuating unit 715 back to the feed conveyor 721.

Referring now to FIGS. 1b and 3b, the cigarette machine 701 is arranged to convert empty cages 501 into filled cages 502. For ready identification, empty cages are indicated by rectangular boxes, and filled cages are denoted by similar rectangular boxes each of which contains two diagonal lines. Each such cage is assumed to contain two filled or two empty trays which are disposed side by side; thus, an empty cage 501 contains two empty trays and a filled cage 502 contains two filled trays.

The diverting conveyor 712 of the cigarette machine 702 transports empty cages to the filling unit 708 and returns filled (converted) cages to the feed conveyor 721. As shown in FIG. 3b, the diverting conveyor 712 may accommodate a reserve of empty cages. If the filling unit 708 requires an empty cage, the machine 702 produces a signal which causes the diverting conveyor 712 to withdraw an empty cage 501 from the feed conveyor 721 and to simultaneously advance an empty cage to the actual filling station of the machine 702. The diverting conveyor 712 comprises a discriminating device or detector which can distinguish between filled and empty cages and which insures that the conveyor 712 invariably diverts empty cages but allows filled cages to advance past the machine 702 and on toward the machine 704. The exact construction and operation of the diverting conveyors is described in our aforementioned copending application Ser. No. 501,775 and, therefore, the following passage of this specification will describe only the basic function and certain essential components of the diverting conveyor 712 for the machine 702. When the filling unit 708 requires an empty cage, the diverting conveyor 712 examines the cages which travel in the endless path defined by the feed conveyor 721 and sidetracks the first empty cage 736 shown in FIG. 3b. This cage 736 is diverted after its carriage comes to rest on a vertically reciprocable section 735 of the guide rail 721a. At the same time, the cage 736 is disengaged from the corresponding motion transmitting lug 944 of the endless chain 940 and is thereupon lowered to the position 738 in which the section 735 (in the lower end position 735′) registers with the lefthand end of an inclined supporting rail 737. The supporting rail 737 serves to guide empty cages during travel through and past the filling unit 708 of the machine 702. The cages which are suspended on the supporting rail 737 advance in stepwise fashion so that their empty trays may be replaced with filled trays. When the section 735 descends to the position 735′, an auxiliary section or bridge 765 automatically enters the gap in the guide rail 721a to allow for unimpeded travel of cages 501, 502 in the endless path defined by the feed conveyor 721.

The overhead carriage of a filled cage 740 which has moved past the filling unit 708 comes to rest on a second reciprocable section 739 of the guide rail 721a. When the section 735 assumes its upper end position, the section 739 assumes a lower end position and registers with the righthand end of the supporting rail 737 so that the filled cage 740 may travel beyond the rail 737 and its carriage comes to rest on the section 739. At the same time, a bridge or auxiliary section 741 extends into the gap formed in the guide rail 721a in response to descent of the section 739 to lower end position. The operation of the diverting conveyor 712 is such that the section 735 assumes its upper end position when the section 739 assumes its lower end position, and vice versa. A filled cage 742 which has been returned onto the feed conveyor 721 in response to upward movement of the section 739 is indicated in FIG. 3b by phantom lines. It is preferred to drive the chain 740 of the feed conveyor 721 and to operate the diverting conveyor 712 at such a speed that the space previously occupied by the empty cage 736 is occupied by the filled cage 742. In other words, that motion transmitting lug 944 of the endless chain 940 which has been disengaged from the carriage of the cage 736 will entrain the filled cage 742 when the section 739 returns to its upper end position to take the place of the bridge 741. The thus returned filled cage 742 then advances along the guide rail 721a to travel past the cigarette machines 704, 703 and on toward the packing machine 706. The bridges 765, 741 insure that the guide rail 721a defines an uninterrupted endless path, even if the one or the other section 735, 739 is moved to its lower end position. Certain details of the programming or control system for the diverting conveyor 712 will be described in connection with FIG. 5. The operation of the remaining three diverting conveyors 711, 713, 714 is the same as that of the conveyor 712 for the machine 702. The operation of the diverting conveyors 601, 602 is analogous, with the aforementioned exception that these diverting conveyors withdraw filled cages 502 and return empty cages 501. The inclined supporting rail 816 of the diverting conveyor 601 (FIG. 3a) for the packing machine 705 corresponds to the rail 737 of the diverting conveyor 712 shown in FIG. 3b. The conveyor 601 is about to lower the filled cage 755 and to return the empty cage 756 back to the main conveyor 721.

When the apparatus is started, each motion transmitting lug 944 on the chain 940 of the feed conveyor 721 abuts against the carriage of a separate cage 501 or 502. Each lug 944 may resemble a hook which pushes or pulls the respective carriage, a lever which is rockable into and out of engagement with the respective carriage, or any other suitable motion transmitting device. As stated before, the lugs 944 are preferably equidistant from each other, and the distance between two consecutive lugs preferably exceeds the distance between the sections 735, 739 of the diverting conveyor 712 as well as the distance between the sections of each other diverting conveyor. Since the diverting conveyors 711–714 invariably replace a withdrawn empty cage 502 with a filled or converted cage 502, and since the diverting conveyors 601, 602 invariably replace a withdrawn filled cage 502 with a converted (empty) cage 501, each lug 944 always engages and entrains or pushes a cage 501, 502 excepting, of course, during intervals when a lug 944 travels from the section 735 to the section 739 of a diverting conveyor after the diverting conveyor has withdrawn a cage from the feed conveyor 721.

The filled cages 502 which were returned by the diverting conveyors 711–714 of the cigarette machines 701–704 advance along the guide rail 721a and bypass the switch 732 and outlet 731 on their way toward the evacuating units 716, 715 of the packing machines 706, 705. The diverting conveyors 602, 601 withdraw filled cages 502 from the conveyor 721 at a rate depending on the output of the machines 706, 705 and advance the thus withdrawn cages through the evacuating units 716, 715. At the same time, the diverting conveyors 602, 601, replace each withdrawn filled cage 502 with a converted (empty) cage 501. Such empty cages then travel along the guide rail 721a and past the switch 729 and outlet 730 back to the cigarette machine 701. The diverting conveyors 711–714 withdraw empty cages from the feed conveyor 721 at a frequency depending on the output of the cigarette machines 701–704. Each of the thus withdrawn empty cages 501 is replaced with a filled cage 502.

The apparatus of FIGS. 1a and 1b could operate properly without the magazines 717–720 and without the storing conveyors 723–726 if each of the packing machines 705, 706 would invariably take up and process the combined output of two cigarette machines, i.e., if the cages which advance beyond the diverting conveyor 601 of the packing machine 705 would invariably constitute empty cages 501 and if the cages which advance beyond the diverting conveyor 713 of the last cigarette machine 703 would invariably constitute filled cages 502. However, the output of individual machines fluctuates almost constantly, and it happens quite frequently that one or more cigarette machines or packing machines must be arrested for the purpose of inspection or repair and/or for other unforeseen reasons. For example, if the packing machine 705 is arrested, a certain number of filled cages 502 will bypass the diverting conveyor 601 and, in the absence of magazines and storing conveyors, each such filled cage will return to the stations occupied by the cigarette machines 701–704 which means that one or more of these machines cannot receive a requisite number of empty cages 501, especially if all of the machines 701–704 operate at full capacity. In other words, the number of filled cages 502 on the feed conveyor 721 would increase and the number of empty cages 501 would decrease so that the cigarette machines 701–704 could not dispose of freshly produced cigarettes and the personnel in charge would be compelled to operate the cigarette machines at less than full capacity. This is highly undesirable since it can happen that, at a later time, one of the cigarette machines must be shut down so that the packing machines 705, 706 will consume more than the combined output of the remaining cigarette machines. In other words, the apparatus of FIGS. 1a and 1b should be provided with means for storing a surplus of empty cages 501 and a surplus of filled cages 502 in order to make sure that the packing machines 706, 705 may operate at full capacity when one or more cigarette machines 701–704 operate at less than full capacity, or vice versa. This is achieved by the provision of the aforementioned magazines 717–720 and storing conveyors 723–726. The purpose of the storing conveyors 723–726 is to replace surplus filled cages 502 on the main conveyor 721 with empty cages 501 and also to replace surplus empty cages with filled cages. When the number of filled cages 502 on the feed conveyor 721 decreases, the storing conveyor 723 removes filled cages from the magazine 719 and supplies such filled cages into the path defined by the guide rail 721a. At the same time, the storing conveyor 723 withdraws filled cages 502 from the auxiliary conveyor 722 and introduces such filled cages into the magazine 719. The magazine 720 serves to supply filled cages 502 to the auxiliary conveyor 722 and via this conveyor 722 to the magazine 719. On the other hand, if the number of empty cages 501 on the feed conveyor 721 decreases, the storing conveyor 726 withdraws empty cages from the magazine 717 and supplies them to the feed conveyor. At the same time, the conveyor 726 withdraws empty cages from the auxiliary conveyor 722 and the latter receives empty cages from the magazine 718 via storing conveyor 724. In addition, the conveyors 725, 724 insure that the cages which fill the magazines 720, 718 are continuously exchanged, even if the endless path defined by the guide rail 721a of the feed conveyor 721 does not accommodate a surplus of empty or filled cages. This is advisable to make sure that the filled cages do not dwell too long in the magazines 719, 720 because excessive delays in delivering a filled cage to the evacuating unit 715 or 716 could result in undesirable drying of tobacco.

The just mentioned exchange of cages which fill the magazines is brought about by the programming system of the apparatus which includes the shifting devices 745, 743, 748, 763 for the switches 728, 729, 732, 733 and the actuating devices 744, 746, 764, 749 for the blocking devices 750, 751, 752, 753. Each of the switches 728, 729, 732, 733 comprises a rail section which is shiftable toward and away from the adjoining portion of the guide rail 721a which forms part of the feed conveyor 721 or toward and away from the adjoining portion of the guide rail which forms part of the auxiliary conveyor 722.

The shifting device 745 for the switch 728 of the storing conveyor 726 comprises two detectors or sensing elements 801, 802. The detector 802 scans the magazine 717 and determines whether or not this magazine is filled, i.e., whether or not an empty cage 501 may be diverted from the auxiliary conveyor 722. The detector 801 scans the cages on the auxiliary conveyor 722 and is capable of discriminating between filled and empty cages. When the detector 802 sends a signal which indicates that the magazine 717 can receive an empty cage 501, and when the detector 801 sends a signal which indicates that an empty cage on the auxiliary conveyor 722 approaches the storing conveyor 726, the shifting device 745 changes the position of the switch 728 so that the empty cage located by the detector 801 is diverted onto the guide rail of the conveyor 726 and enters the magazine 717. The shifting device 745 immediately returns the switch 728 to inoperative position so that the storing conveyor 726 receives a single empty cage 501 at a time. Such empty cage comes into abutment with the preceding cage in the magazine 717.

The shifting device 743 for the switch 729 of the storing conveyor 725 also comprises two detectors 804, 805. The detector 805 scans the magazine 720 and determines whether or not this magazine is filled to capacity. The detector 804 scans the cages which advance on the guide rail 721a of the feed conveyor 721 and sends a signal when the switch 729 is approached by a filled cage 502. If the magazine 720 has room for a filled cage and if the detector 804 locates a filled cage, the shifting device 743 changes the position of the switch 729 so that the filled cage is diverted onto the storing conveyor 725 and enters the rear end of the magazine 720. The shifting device 743 moves the switch 729 to operative position only for such an interval of time that the magazine 720 can receive a single filled cage 502 at a time. When the switch 729 returns to inoperative position, all of the cages which have bypassed or which were transferred by the diverting conveyor 601 for the packing machine 705 are free to bypass the storing conveyor 725 and to advance toward the diverting conveyor 711 of the first cigarette machine 701.

The detectors of the shifting devices 763, 748 for the switches 733, 732 of the storing conveyors 723, 724 are indicated in FIG. 1a by arrows but are not identified by numerals. The function of these detectors is analogous to that of the previously described detectors 801, 802 and 804, 805. The detectors of the shifting device 748 scan the magazine 718 and the cages which advance beyond the diverting conveyor 713 of the last cigarette machine 703. The detectors of the shifting device 763 scan the magazine 719 and the cages which advance on the adjoining portion of the auxiliary conveyor 722. Common to all of the four shifting devices 743, 745, 748, 763 is the feature that they shift the corresponding switches to operative positions only when the respective magazines are not filled to capacity and also that each magazine can receive only one cage at a time. Furthermore, the magazines 717, 718 receive only empty cages 501 and the magazines 719, 720 receive only filled cages 502.

If one of the magazines 717–720 receives a cage, the place of such cage on the conveyor 721 or 722 is immediately occupied by another cage. Thus, and if the switch 729 diverts a filled cage 502 from the main conveyor 721 and into the magazine 720, the magazine 717 discharges an empty cage 501 which takes the place of the diverted filled cage. The empty cage is discharged in response to a signal produced by the actuating device 746 for the blocking device 751 which latter controls evacuation of empty cages from the magazine 717 via outlet 730. When the switch 733 diverts a filled cage 502 from the auxiliary conveyor 722 into the magazine 719, the actuating device 749 immediately causes the blocking device 753 to permit discharge of an empty cage 501 from the magazine 718 so that such empty cage takes the place of the filled cage which was introduced into the magazine 719. Similar observations hold true for the remaining two actuating devices 744, 764.

Figure 4:
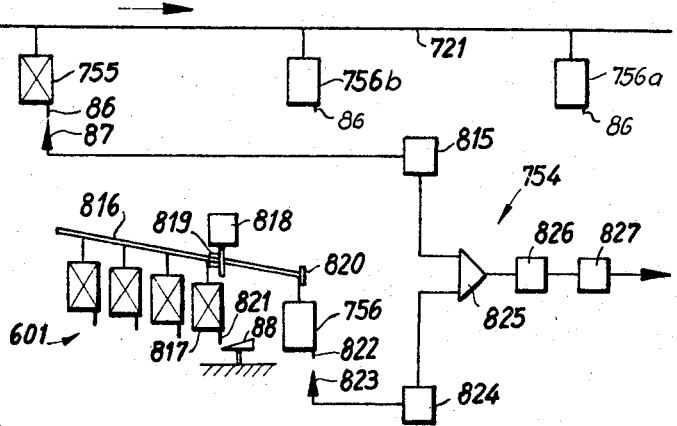
Figure 6:
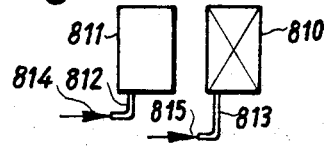
FIG. 6 is an enlarged side elevational view of two receptacles.

The control system 754 which regulates the operation of the diverting conveyor 601 for the packing machine 705 is illustrated in FIGS. 4 and 6. FIG. 4 shows a portion of the feed conveyor 721 whose chain 740 is driven in the direction from the left to the right, as viewed in FIG. 4. The cages are maintained at a uniform distance from each other and FIG. 4 shows two empty cages 756a, 756b followed by a filled cage 755. Each of the cages 755, 756b, 756a is provided with a downwardly extending indicator gauge 86. The arrangement is such that the gauge 86 of the filled cage 755 extends downwardly and beyond the level of a gauge 86 which is provided on the empty cage 756b or 756a. In other words, the extent to which the gauges 86 project downwardly and beyond the respective cages is indicative of the condition of such cages, namely, whether or not a cage contains one or more filled trays or one or more empty trays. The position of the gauge 86 on a filled cage should be sufficiently different from the position of the gauge 86 on an empty cage so as to make sure that the gauges on filled cages can produce certain signals which cannot be produced by the gauges of empty cages, and vice versa.

FIG. 6 illustrates on a larger scale two adjoining cages including an empty cage 811 and a filled cage 810. The indicator gauge 812 of the empty cage 811 is partially retracted but the gauge 813 of the filled cage 810 extends well beyond the gauge 812. Thus, a detector 814 which extends into the path of the partially retracted gauge 812 can be actuated by this gauge but will be bypassed by the gauge 813 of the filled cage 810. Inversely, a detector 815 which can be actuated by the extended gauge 813 of the filled cage 810 cannot be actuated by the partially retracted gauge 812 of the empty cage 811. It will be noted that the lower end portions of the gauges 812, 813 shown in FIG. 6 are bent in a direction to the left. In FIG. 4, the lower end portions of the gauges 86 are bent in a direction toward the observer. Each of the detectors 814, 815 may constitute an electric switch or an analogous signal generating element.

A detector 87 which corresponds to the detector 815 of FIG. 6 is illustrated in FIG. 4 in a position of engagement with the extended indicator gauge 86 on the filled cage 755. In such position of the filled cage 755, the gauge 86 trips the detector 87 so that the latter causes an impulse generator 815 to produce a suitable signal. The filled cages which are lowered by the diverting conveyor 601 are temporarily supported by the aforementioned inclined supporting rail 816 which slopes downwardly in a direction to the right, as seen in FIG. 4 (see also FIG. 3a). The diverting conveyor 601 further comprises a stop 819 which can be reciprocated by a double-acting cylinder 818 or the like so as to extend into or to be retracted from the path of carriages on the filled cages which are being permitted to descend along the supporting rail 816. The rightmost filled cage 817 on the supporting rail 816 is illustrated in a position in which its overhead carriage abuts against the stop 819 so that this cage is in a position in which its filled tray or trays may be replaced with one or more empty trays. When the cage 817 is converted into an empty cage, the stop 819 is automatically retracted by the cylinder 818, and the thus converted cage is permitted to slide along the supporting rail 816 to take the position 756. The diverting conveyor 601 further comprises a resetting device 88 which resembles a cam and whose function is to shift the gauge 821 of the cage 817 during movement of this cage to the position 756. The gauge 821 of the cage 817 is illustrated in an extended position but, after traveling along the inclined cam face of the resetting device 88, the gauge 821 is shifted to its retracted position as indicated at 822. In the position 756, the freshly converted empty cage 817 abuts against an arresting member 820 which prevents it from falling off the right hand end of the supporting rail 816. In its retracted position 822, the gauge 821 on the freshly converted cage 817 (in the position 756) actuates a detector 823 which forms part of a second impulse generator 824. The output of the impulse generator 824 is connected to one input of a logical AND circuit 825. The detector 823 continues to send signals to the impulse generator 824 as long as the freshly converted cage 817 remains in the position 756, namely, as long as this cage abuts against the arresting member 820 at the right hand end of the supporting rail 816.

The AND circuit 825 comprises a second input which is connected to the output of the first impulse generator 815. The circuit 825 sends a signal to an amplifier 826 only at such times when it receives a signal from the first impulse generator 815 and from the second impulse generator 824. In other words, the AND circuit 825 will send to the amplifier 826 a signal only at a time when the detector 87 is engaged by the extended gauge 86 of a filled cage 755 on the main conveyor 721 and when a converted (empty) cage 817 in the position 756 maintains its retracted gauge 821 (in the position 822) in engagement with the detector 823 of the second impulse generator 824. The amplifier 826 then starts a drive 827 for the diverting conveyor 601 so that the conveyor causes the filled cage 755 to descend to the level of the supporting rail 816 whereas the converted cage 817 (in the position 756) simultaneously rises and is reconnected to the feed conveyor 721. As mentioned in connection with FIGS. 3a and 3b, the operation of the diverting conveyor 601 is preferably such that, after lifting, the empty cage (position 756) takes the place of the filled cage 755.

Figure 5:
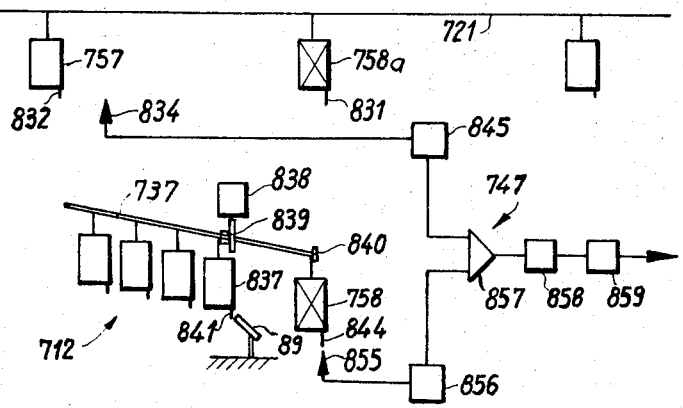
FIG. 5 is an enlarged view of a detail of the structure shown in FIG. 3b.

The diverting conveyor 712 of the cigarette machine 702 is shown in FIG. 5, together with a control system 747 which regulates the operation of this conveyor. The numeral 721 again denotes a portion of the feed conveyor whose chain 940 (FIG. 1) is assumed to travel in a direction from the left to the right and to advance filled and empty cages in such a way that they are equidistant from each other. FIG. 5 shows an empty cage 757 having a partially retracted gauge 832 and trailing a filled cage 758a whose gauge 831 is fully extended.

A first detector 834 extends into the path of gauges 832 on empty cages 757 but is bypassed by the gauges 831 of filled cages 758a. In other words, the detector 834 can produce a signal only when it is tripped by a partially retracted gauge 832 which is indicative of an empty cage 757. The detector 834 causes a first impulse generator 845 to produce a signal which is transmitted to one input of a logical AND circuit 857. The other input of the AND circuit 857 is connected to a second impulse generator 856 having a detector 855 which can be tripped by the extended gauge 841 (in the position 844) of a freshly converted cage 837 (in the position 758). The diverting conveyor 712 comprises the aforementioned inclined supporting rail 737 (see also FIG. 3b) which can support several empty cages on their way toward an arresting member 840 which holds the freshly converted cage 837 in the position 758 in which the converted cage is ready for return movement onto the feed conveyor 721. A double-acting cylinder 838 is provided to reciprocate a stop 839 into and from the path of the overhead carriage on the foremost cage 837 which is supported by the rail 737. That empty cage which actually abuts against the stop 839 is being converted into a filled cage and thereupon moves to the position 758. This cage is then allowed to advance into abutment with the arresting member 840.

On its way from the stop 839 to the arresting member 840, the gauge 841 of the foremost empty cage 837 travels along a resetting device 89 which adjusts the gauge in such a way that the gauge (844) of each freshly converted (filled) cage (758) assumes a position corresponding to that of the gauge 813 shown in FIG. 6. The resetting device 89 is shown in FIG. 7 and comprises an inclined cam or ramp 843 having a cam face 842 which is tracked by the bent end portion of the gauge 812 while the corresponding cage travels in the direction indicated by an arrow 812a. The inclination of the cam face 842 exceeds the inclination of the supporting rail 737 so that the gauge 812 is automatically withdrawn to its extended position (813 or 844) and then indicates that a cage which has passed along the resetting device 89 has been converted into a filled cage (758 or 810).

The gauge (844) of the filled cage (758) shown in FIG. 5 actuates the detector 855 which forms part of the second impulse generator 856 connected to one input of the AND circuit 857. The other input of the circuit 845 is connected to the impulse generator 845 which includes the detector 834, the latter serving to detect empty cages 757 on the feed conveyor 721 and being arranged to be tripped by the gauge 832 of an empty cage. The gauge (844) of the freshly converted cage (758) remains in engagement with the detector 855 as long as the freshly converted cage (758) remains in abutment with the arresting member 840. When the gauge 832 of the empty cage 757 trips the detector 834, the AND circuit 857 transmits a signal to an amplifier 858 for the drive 859 of the diverting conveyor 712 whereby the conveyor lowers the empty cage 757 onto the supporting rail 737 and simultaneously returns the freshly converted cage (758) onto the feed conveyor 721. The circuit 857 sends to the amplifier 858 a signal only when a freshly converted cage (758) is ready to return onto the feed conveyor 721 and when the detector 834 of the first impulse generator 845 has been engaged by the gauge 832 of an empty cage 757 on the feed conveyor. In other words, if there is a delay in conversion of the foremost empty cage 837 on the supporting rail 737 of the diverting conveyor 712 into a filled cage (758), the empty cage 757 will advance beyond the detector 834 and will continue to travel on to the diverting conveyor 714 because the drive 859 for the conveyor 712 can be started only when a freshly converted cage (758) abuts against the arresting member 840.

The manner in which the magazine 720 may receive and discharge filled cages is illustrated in FIG. 8. The shifting device 743 for the switch 729 of the storing or intermediate conveyor 725 comprises the aforementioned detectors 804, 805. The actuating device 744 for the blocking device 750 comprises a single detector 866. It will be noted that the indicating gauges on all of the cages shown in FIG. 8 are illustrated as extending laterally from one of the shorter sides of the cages. In actual practice, the gauges preferably extend downwardly (see FIG. 7), and FIG. 8 shows them in different positions only because FIG. 8 is a top plan view of the apparatus and, if properly positioned, the gauges 860 could not be seen in this illustration. A properly positioned gauge 812 is shown on the empty cage 501 which travels on the auxiliary conveyor 722.

The detector 804 forms part of an impulse generator 861 and extends into the path of extended gauges 860 on filled cages 870 which travel on the feed conveyor 721. The position of the gauge 860 on the filled cage 870 shown in FIG. 8 corresponds to the extended position of the gauge 813 shown in FIG. 6. The impulse generator 861 is connected to one input of a logical AND circuit 862 whose other input is connected with an inverter 864. The inverter 864 can receive signals from an impulse generator 863 which includes the aforementioned detector 805. The detector 805 scans filled cages in the magazine 720 and sends an impulse when the magazine 720 has room for an additional filled cage. FIG. 8 indicates by broken lines that space or compartment in the magazine 720 which can be occupied by an additional filled cage. The signals sent by the impulse generator 863 in response to detection by its detector 805 of an empty compartment in the magazine 720 are transmitted to the AND circuit 862 via inverter 864 so that the circuit 862 is conditioned and sends an impulse to a starter or amplifier circuit 873 as soon as the detector 804 of the impulse generator 861 detects a filled cage 870. The starter circuit 873 then operates a drive 874 which moves the switch 729 from the solid-line position to the broken-line position of FIG. 8 whereby the filled cage 870 is sidetracked from the feed conveyor 721 and is compelled to travel with the storing conveyor 725 to occupy the last compartment in the magazine 720. The detector 805 then ceases to generate an impulse and the AND circuit 862 arrests the drive 874. The impulses transmitted by the circuit 862 to the starter circuit 873 are such that the switch 729 returns to the solid-line position of FIG. 8 as soon as it has sidetracked a single filled cage 870, i.e., the magazine 720 can receive only one filled cage at a time. The detector 805 conditions the AND circuit 862 when it detects an empty compartment in the magazine 720, and the circuit 862 produces a signal which results in sidetracking of a filled cage 870 as soon as such filled cage has been located by the detector 804 of the impulse generator 861.

The foremost filled cage 865 in the magazine 720 invariably abuts against the blocking device 750 because the elastically deformable or yieldable motion transmitting lugs 393 (FIG. 1) of the chain 935 which forms part of the storing conveyor 725 travel continuously in their endless path and immediately advance the filled cages upwardly, as viewed in FIG. 8, i.e., as soon as the blocking device 750 opens.

The detector 866 forms part of the actuating device 744 and is a two-way detector, i.e., it can send a signal in response to detection of filled and/or empty cages 502, 501 which travel on the auxiliary conveyor 722. When the auxiliary conveyor 722 advances a series of equidistant empty and filled cages 501, 502, the detector 866 produces signals as identical intervals and the actuating device 744 then remains idle. However, if the detector 866 finds that a cage is missing on the auxiliary conveyor 722 (because such a cage was sidetracked into the magazine 717), it fails to send a signal to the actuating device 744 and the latter then produces a signal which starts a drive 867 for the blocking device 750. The blocking device 750 allows the storing conveyor 725 to remove from the magazine 720 the foremost filled cage 865 and to advance such filled cage along the outlet 727 and onto the auxiliary conveyor 722 where the filled cage 865 takes the place of the empty cage which has been admitted into the magazine 717. The detector 866 need not discriminate between empty and filled cages because its sole function is to determine whether or not a cage is missing on the auxiliary conveyor 722 irrespective of whether the missing cage is a filled cage or an empty cage. As a matter of fact, the detector 866 can only find that an empty cage is missing because, if a cage is missing on that portion of the auxiliary conveyor 722 which extends from the switch 728 of the storing conveyor 726 to the outlet 727 of the storing conveyor 725, such a missing cage must be an empty cage, namely, that cage which has been admitted into the magazine 717. The impulses transmitted by the actuating device 744 to the drive 867 for the blocking device 750 are delayed sufficiently to insure that the foremost filled cage 865 which leaves the magazine 720 in response to temporary opening of the blocking device 750 enters the empty spot on the auxiliary conveyor 722.

If desired, the detector 866 and the entire actuating device 744 for the blocking device 750 may be omitted provided that the drive 867 for the blocking device 750 receives impulses from the shifting device 745 for the switch 728 of the storing conveyor 726. This modified arrangement is indicated in FIG. 8 by broken lines. The shifting device 745 is constructed in the same way as the shifting device 743 for the switch 729 of the storing conveyor 725. It comprises a logical AND circuit 868 which will send an impulse to the starter circuit 873a for the drive 874a of the switch 728 when the magazine 717 can receive an empty cage and when an empty cage approaches the switch 728. When the AND circuit 868 causes the switch 728 to divert an empty cage 501 into the magazine 717, is also sends an impulse to a delay circuit 869 which thereupon starts the drive 867 for the blocking device 750 with such a delay that the blocking device 750 releases the foremost filled cage 865 from the magazine 720 in good time for entry into the path defined by the auxiliary conveyor 722 so that the filled cage 865 takes the place previously occupied by the empty cage 501 which has been sidetracked into the magazine 717.

The detector 801 (see FIG. 1) of the shifting device 745 for the switch 728 of the storing conveyor 726 is arranged to detect empty cages 501, and the detector 802 of the shifting device 745 is arranged to detect the presence or absence of an empty compartment in the magazine 717.

The shifting device 748 for the switch 732 of the storing conveyor 724 is analogous to the shifting device 745, and the shifting device 763 for the switch 733 of the storing conveyor 723 is identical with the shifting device 743. The actuating devices 746, 749, 764 may be identical with the actuating device 744 of FIG. 8. Alternatively, these actuating devices 746, 749, 763 may be omitted altogether if the drives for the blocking devices 751–753 are operated by the shifting devices 745, 748, 763 in the same way as described in connection with the modification shown in the upper right-hand part of FIG. 8.

The function of the switches 728, 729, 732 and 733, of the outlets 727, 730, 731 and 734, and of the blocking devices 750–753 will be described with reference to FIGS. 1a and 1b. It is now assumed that the diverting conveyor 713 has discharged a filled cage 502 which has been returned onto the feed conveyor 721. The cage 502 travels from the diverting conveyor 713 toward the switch 732 which can admit only an empty cage 501 so that the filled cage 502 travels past the magazine 718 and past the outlet 731 of the storing conveyor 723 to reach the diverting conveyor 602 of the packing machine 706. If the evacuating unit 716 of the packing machine 706 does not require a filled cage, the cage 502 travels toward the packing machine 705. If the evacuating unit 715 of the packing machine 705 also does not require a filled cage, the filled cage 502 continues to travel toward the switch 729 of the storing conveyor 725. If the detector 805 of the shifting device 743 for the switch 729 indicates that the magazine 720 can accommodate a filled cage, The switch 729 is caused to sidetrack the filled cage 502 into the magazine 720.

The thus sidetracked filled cage 502 constitutes the last cage of the row of cages in the magazine 720 and is advanced in stepwise fashion until it reaches the blocking device 750. When the blocking device 750 is opened by the actuating device 744, the filled cage 502 travels through the outlet 727 and enters the path defined by the auxiliary conveyor 722. This takes place only when the detector of the actuating device 744 has located an empty spot on the conveyor 722. Once it enters the conveyor 722 via outlet 727, the filled cage 502 circulates in the path defined by the conveyor 722 until the detector of the shifting device 763 for the switch 733 of the storing conveyor 723 indicates that there is room in the magazine 719. Once it enters the magazine 719, the filled cage 502 advances in stepwise fashion toward the blocking device 752 and is ultimately transferred back into the endless path defined by the feed conveyor 721 to advance through the outlet 731 and toward the diverting conveyor 602 of the packing machine 706. If the filled cage 502 is not required in the evacuating unit 716 of the packing machine 706, it advances to the diverting conveyor 601 of the packing machine 705 and, if not removed from the main conveyor 721, continues to travel toward and past the switch 729 to the diverting conveyors 711–714 of the cigarette machines 701–704. The circulation of the filled cage 502 is then repeated util the cage is taken up by one of the diverting conveyors 601, 602 to be transferred to the corresponding evacuating unit 715 or 716 and to be converted into an empty cage 501.

If the just described filled cage 502 has been sidetracked by the diverting conveyor 602 of the packing machine 706, it returns onto the feed conveyor 721 as an empty cage 501 which thereupon advances toward and past the packing machine 705. This empty cage 501 also bypasses the switch 729 of the storing conveyor 725 because the magazine 720 can accommodate only filled cages. On further travel past the outlet 730 of the storing conveyor 726, the empty cage 501 reaches the diverting conveyor 711 of the first cigarette machine 701. If it is not needed at the filling station 707 of the machine 701, the empty cage 501 advances to the diverting conveyor 712, thereupon to the diverting conveyor 714, and finally to the diverting conveyor 713. If it is not removed by any of the conveyors 712–714, the empty cage 501 travels toward the switch 732 of the storing conveyor 724. If the magazine 718 can accommodate an additional empty cage, the shifting device 748 moves the switch 732 to operative position so that the empty cage 501 which has bypassed the diverting conveyor 713 of the last cigarette machine 703 is introduced into the magazine 718. Such empty cage then advances in stepwise fashion and ultimately reaches the blocking device 753 which admits it into the path defined by the auxiliary conveyor 722 as soon as the detector of the actuating device 749 locates an empty spot on this auxiliary conveyor. The empty cage 501 is then advanced by the auxiliary conveyor 722 until it can enter the magazine 717 through the switch 728. Of course, the switch 728 is moved to operative position only when the detectors 801, 802 indicate that the magazine 717 is not completely filled and also that the cage which approaches the switch 728 is an empty cage. Once in the magazine 717, the empty cage 501 advances in stepwise fashion and reaches the blocking device 751 which admits it into the path defined by the feed conveyor 721 as soon as the corresponding detector of the actuating device 746 locates an empty spot on the conveyor 721. Thus, the empty cage 501 has now travelled through the magazines 718, 717 and is on its way back to the diverting conveyor 711 of the first cigarette machine 701. If the empty cage 501 is not required by the filling units 707 to 710, it again advances toward the switch 732 of the storing conveyor 724 and can enter the magazine 718 provided, of course, that the last compartment of this magazine 718 is empty. The travel of the empty cage 501 is then repeated in the previously described manner.

If the operators decide to arrest the packing machines 705, 706, or if these machines are halted for another reason, the empty cages 501 are gradually converted into filled cages 502. The previously described method of circulating empty cages is such that the empty cages are delivered to the diverting conveyors 711–714 without undue delay so that each of the filling units 707–710 can receive an empty cage as soon as the empty cage is needed to receive the output of the corresponding cigarette machine.

When one or more cigarette machines 701 to 704 are idled, the situation is reversed, i.e., the filled cages are gradually converted into empty cages so that, in response to idling of all of the cigarette machines, the various conveyors and magazines of the apparatus shown in FIGS. 1a and 1b will accommodate only a supply of empty cages. This is advisable when the production line is arrested because, by converting all of the cages into empty cages, the production line is free of any unprocessed tobacco-containing products. There is no delay in delivery of filled cages 502 to the evacuating units 715, 716 because the cages circulate in the aforedescribed manner, namely through the magazines 719, 720 and toward the diverting conveyors 601, 602 of the packing machines 705, 706.

The apparatus of FIGS. 1a and 1b is preferably operated in such a way that the cages are circulated faster than is necessary for proper feeding of cages to the filling units 707–710 and evacuating units 715, 716. This insures that the filled cages 502 which have entered the magazines 719, 720 and/or are located in the path defined by the auxiliary conveyor 722 rapidly return into the path defined by the feed conveyor 721. In other words, such rapid conveying of cages insures that the tobacco-containing products which fill the cages 502 cannot lose excessive moisture before they enter the evacuating station 715 or 716. Such operation is highly desirable in processing of cigarettes and similar products which should be packed, wrapped and sealed as soon as possible, i.e., as soon as possible after they leave the respective cigarette machines. It is also advisable, for the same reason, to convert all filled cages 502 into empty cages 501 at the end of a shift or whenever the production line is arrested for a longer period of time. Thus, when the production line is started again, the conveyor system contains only empty cages 501 and the magazines 719, 720 are empty.

When the production line is started, the packing machines 705, 706b remain idle for a period of time which is required to fill up a certain number of cages. The cigarette machines 701–704 are started immediately and the conveyors 721–726 are started at the same time, preferably at a higher than normal speed so that the empty cages circulate at higher than average speed. In other words, when the machines 701–704 are set in motion, the conveyor system circulates empty cages 501 at a speed which is higher than required for properly supplying the filling units 707–710, even if the machines 701–704 operate at full capacity. Due to such higher speed of the conveyor system, filled cages 502 which enter the magazines 719, 720 are rapidly removed therefrom and are admitted to the evacuating units 715, 716 of the packing machines 705, 706. As soon as the cigarette machines 701–704 turn out a requisite number of filled cages 502, the personnel in charge will start the packing machines 705, 706 so that all machines of the production line operate normally but the conveyor system still operates at a higher than average speed. This insures that the number of filled and empty cages which are removed from the magazines 717–720 exceeds the momentary requirements of the machines 701–706.

By way of example, the conveyor system may circulate 105 empty cages per unit of time. In normal operation, the four cigarette machines 701–704 can convert 100 empty cages per same unit of time so that the conveyor system then circulates 100 filled cages and five empty cages. The five empty cages enter the magazines 717, 718 whereby the magazines 719, 720 release five filled cages. Thus, the conveyor system will circulate 105 filled cages whereas, when operated at normal speed, the two packing machines 705, 706 convert only 100 filled cages 502 per unit of time. Consequently, the cages which, during each unit of time, travel in the path located downstream of the diverting conveyor 601, will include 100 empty cages and five filled cages. The five filled cages are admitted into the magazines 719, 720 and the magazines 717, 718 release five empty cages in exchange for such stored cages. Consequently, the cigarette machines 701–704 again receive a total of 105 empty cages per unit of time. The just described example indicates that the cages which enter the magazines 717–720 are rapidly exchanged, i.e., that the contents of the magazines are continuously depleted and replenished due to the fact that the conveyor system operates at a speed which is higher than necessary to supply cages to the stations 707–710 and 715, 716 at the exact rate at which the cages are being converted when the machines 701–706 operate at normal speed.

If the production line is to be halted, for example, at the end of a day's shift, the cigarette machines 701–704 are arrested in the first step so that they cease to convert empty cages 501 into filled cages 502. For example, the production line may be constructed in such a way that the cigarette machines 701–704 will be arrested 30 minutes before the actual end of a day's shift. The conveyor system carries a sufficient number of filled cages 502 to meet the requirements of the evacuating devices 715, 716 for half an hour. Due to the previously described operation of the various switches, shifting devices, blocking devices and actuating devices, filled cages 502 are advanced preferentially so that they are rapidly fed to the diverting conveyors 601, 602 and thence to the corresponding evacuation units 715, 716. When all of the filled cages 502 are converted into empty cages, the personnel in charge will bring the packing machines 705, 706 and the conveyors 721–726 to a halt, and the production line then contains only empty cages 501.

Figure 2A:
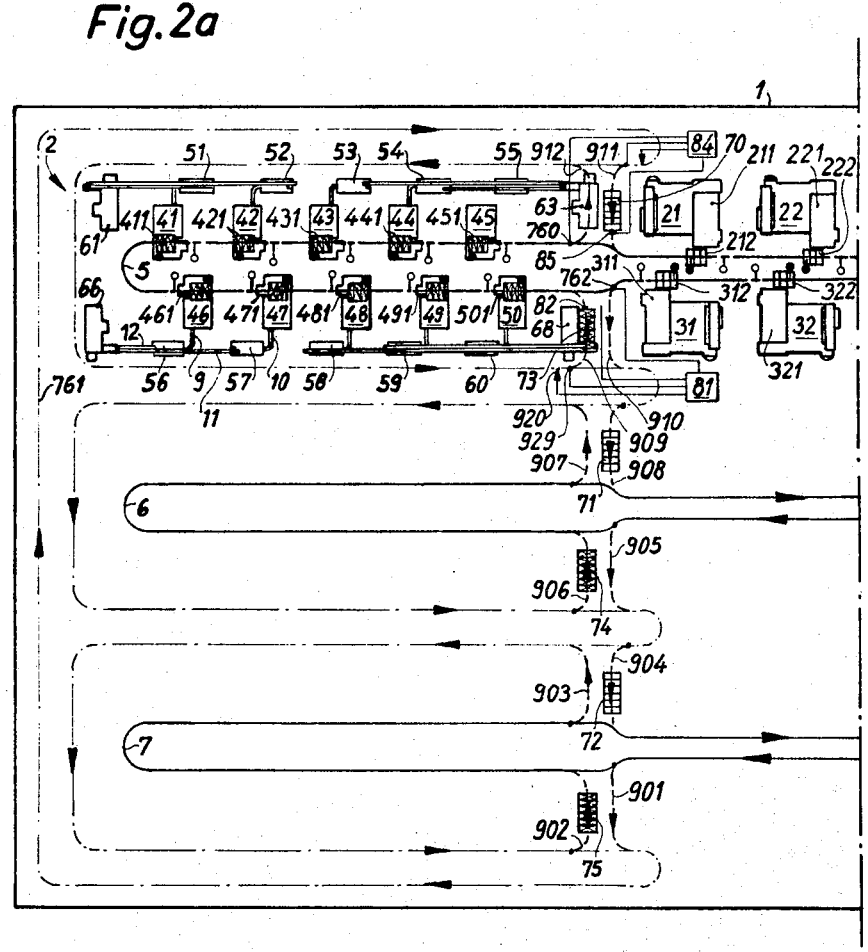

Referring to FIGS. 2a and 2b, there is shown a modified apparatus which constitutes a large production line and is mounted on the rectangular floor 1 of a tobacco processing plant. The floor 1 supports three distinct groups or assemblies 2, 3, 4 of machines and an equal number of conveyor systems for filled and empty cages. Only the group 2 is shown in greater detail because the non-illustrated portions of the groups 3 and 4 are of identical construction.

The group 2 comprises two classes of machines, namely, twenty producing machines 21 to 40 each of which is assumed to constitute a cigarette machine or filter cigarette machine. The other class of machines in the group 2 comprises ten consuming or packing machines 41–50. The machines 21–40 may be of the type which assemble filter rod sections with cigarette rod sections by wrapping the sections into adhesive tape which secures the filter rod sections to the corresponding cigarette rod sections, or of the type wherein finished cigarettes are coupled with filter mouthpieces. The total number of machines (21–50) is selected in such a way that the normal output of the machines 21–40 corresponds to normal requirements of the machines 41–50. In other words, each of the packing machines 41–50 can consume or process the output of two cigarette machines. Of course, if the ratio of the capacity of a packing machine to the capacity of a cigarette machine is not two-to-one, the number of machines in the group 2 must be adjusted accordingly or, better to say, the ratio of the number of cigarette machines to the number of packing machines must be changed. As a rule, the combined consumption of all packing machines (in normal operation of the production line)

should equal the combined output of all cigarette machines.

The cigarette machines 21-40 respectively comprise filling units 211, 221, 231, 241 . . . 391, 401, and these filling units respectively receive empty cages from diverting conveyors 212, 222, 232 . . . 392, 402. The diverting conveyors 212 . . . 402 serve to withdraw empty cages from the endless path defined by a feed conveyor 5 and to deliver converted (filled) cages back into such endless path, i.e., their operation is the same as that of the diverting conveyors 711-714 shown in FIGS. 1b, 3b and 5.

The packing machines 41-50 respectively comprise evacuating units 411, 421 . . . 491, 501, and each of these evacuating units receives filled cages from a diverting conveyor corresponding to the diverting conveyor 601 or 602. The diverting conveyors for the packing machines 41-50 withdraw filled cages from the feed conveyor 5 and return converted (empty) cages back onto this same feed conveyor.

The ouput of the packing machines 41-50 is respectively delivered to wrapping machines 51-60 wherein the cigarette packs are wrapped into sheets of cellophane or other transparent or translucent heat-sealable material. The output of the wrapping machines 51, 52 is delivered to a binding or tying machine 61 which assembles and binds several packs into larger bundles. Additional binding machines 63, 66 and 68 respectively receive the output of packing machines 53-55, 56-57 and 58-60, i.e., the production line including the group 2 comprises a total of four binding machines. Transfer conveyors 9, 10, 11 and 12 are provided to deliver cigarette packs from the machines 41-50 to the respective wrapping machines 51-60 and to deliver the wrapped packs from the machines 51-60 to the binding machines 61, 63, 66 and 68. The take-off conveyors which receive bundled packs from the machines 61, 63, 66 and 68 are not shown in FIG. 2a.

The feed conveyors for the groups 3 and 4 are respectively indicated by reference numerals 6 and 7. Each group further comprises four storing or intermediate conveyors 901-904 (group 4), 905-908 (group 3) and 909-912 (group 2). These storing conveyors connect the feed conveyors 5, 6, 7 with a meandering auxiliary conveyor 761. The storing conveyors 902, 904, 906, 908, 909 and 901 respectively extend through magazines 75, 72, 74, 71, 73 and 70. The magazines 70, 71 and 72 accommodate empty cages, and the remaining magazines 73, 74, 75 accommodate filled cages.

The construction and operation of the conveyors 5-7, 901-912 and 761 is analogous to that of the conveyors 721, 723-726 and 722 of FIGS. 1a and 1b. In other words, each of the conveyors 5-7, 901-912 and 761 also comprises a fixed guide rail and an endless chain which is provided with motion transmitting projections or lugs capable of entraining or pushing empty or filled cages along the respective guide rails. The lugs of the storing conveyors 902, 904, 906, 908, 909, 911 are elastically deformable or are biased by yieldable springs so that the corresponding chains may travel even if the blocking devices for the magazines 70-75 prevent removal of cages therefrom. Each magazine is provided with a blocking device, and each storing conveyor comprises a switch which is shiftable to and from an operative position and an outlet which is fixedly mounted to discharge into the auxiliary conveyor 761 or into one of the feed conveyors 5, 6, 7.

It will be noted that the storing conveyors 901, 903, 905, 907, 910 and 912 do not extend through magazines, i.e., that the number of magazines (70-75) is less than the number of storing conveyors (901-912).

The manner in which the switches of the storing conveyors 901-912 are controlled and shifted will now be described with reference to FIG. 9 of the drawings. This illustration shows the magazine 73, the storing conveyors 909, 910, a portion of the feed conveyor 5, and a portion of the auxiliary conveyor 761. The switch 929 of the storing conveyor 909 may be moved from the solid-line position to the broken-line position so that it respectively permits all cages to travel along the auxiliary conveyor 761 or deflects filled cages into the magazine 73. The switch 762 of the storing conveyor 910 may be moved from the solid-line position in which it allows unimpeded advance of cages along the feed conveyor 5 to the broken-line position in which filled or empty cages are deflected onto the conveyor 910 and to the outlet 934. The outlet of the conveyor 909 is shown at 932. Both outlets are rigidly mounted so that they invariably direct cages onto the conveyor 5 or 761.

The programming system 81 which controls the travel of cages along the storing conveyors 909, 910 comprises an impulse generator 921 having a detector 920 which is located upstream of the switch 929 and examines the cages which are advanced by the auxiliary conveyor 761. The detector 920 corresponds to the detector 815 of FIG. 6, i.e., it is mounted to detect filled cages and each cage is again provided with a gauge (not shown in FIG. 9) which may be moved to and from an extended position whereby the position of the gauge reflects the condition of the respective cage. The impulse generator 921 sends a signal when the detector 920 is engaged by the extended gauge of a filled cage. Such signal is transmitted to a release generator 922 which, in turn, sends a signal to a delay circuit 923 controlling the actuating device 924 for the blocking device 82 of the magazine 73. The generator 922 also sends a signal to a second delay circuit 925 which controls the shifting device 926 for the switch 762 of the storing conveyor 910. Still further, the generator 922 sends a signal to a third delay circuit 927 which controls the shifting device 928 for the switch 929 of the storing conveyor 909. The switches 762 and 929 normally assume their solid line positions and then form part of the conveyors 5, 761, respectively.

In response to detection of a filled cage by the detector 920, the generator 922 causes the device 928 to shift the switch 929 to the broken-line position so that a single filled cage can be diverted onto the storing conveyor 909 and enters the magazine 73. The generator 922 also causes the actuating device 924 to open the blocking device 82 so that the foremost filled cage 931 can leave the magazine 73 and is advanced through the outlet 932 and into the path defined by the feed conveyor 5. Furthermore, the generator 922 causes the device 926 to shift the switch 762 to the broken-line position so that a single cage (which may be a filled cage or an empty cage) can be diverted onto the storing conveyor 910 to be transferred from the feed conveyor 5 through the outlet 934 and onto the auxiliary conveyor 761. The delay circuits 923, 925 are adjusted in such a way that the filled cage 931 which is released from the magazine 73 takes the place of the cage which has been diverted by the switch 762. Also, the filled cage which has been diverted by the switch 929 is replaced on the conveyor 761 by that cage which has been diverted by the switch 762 and was caused to travel along the storing conveyor 910 and onto the auxiliary conveyor 761. Thus, after the generator 922 has sent signals to the delay circuits 923, 925, 927, and after the delay circuits have operated the devices 924, 926, 928, the magazine 73 again accommodates the same number of filled cages as before, and each motion transmitting lug of the conveyors 5, 761 entrains or pushes a cage.

It is to be noted that the cages which travel on the feed conveyor 5 and which approach the switch 762 of the storing conveyor 910 are normally filled because the switch 762 is located downstream of the last cigarette machine 31 (see FIG. 2a). Such filled cages will be free to move directly to the first packing machine 50 only if a filled cage on the auxiliary conveyor 761 fails to approach the detector 920 of the programming system 81 shown in FIG. 9. If a filled cage does approach the switch 929 of the storing conveyor 909, such filled cage is preferred over the filled cage which has moved past the last cigarette machine 31 and approaches the switch 762.

Therefore, the switch 762 is moved to its broken-line position and diverts the filled cage from the feed conveyor 5 so that the latter can receive the foremost filled cage 931 from the magazine 73. This insures that the evacuation of filled cages is not unduly delayed. Of course, it is even more advantageous if the cage which approaches the switch 762 is an empty cage because such empty cage is then replaced by a filled cage 931 which latter is discharged from the magazine 73. On the other hand, if the switch 762 diverts a filled cage in exchange for a filled cage 931 which is discharged from the magazine 73, such exchange is still desirable because, as a rule and barring some extreme operating conditions, a filled cage which approaches the switch 762 was filled subsequent to filling of the foremost cage in the magazine 73. The just described mode of operation insures that the contents of the magazines 70-75 are rapidly evacuated and replaced and that each filled tray is rapidly delivered to that packing machine whose evacuating unit requires a fresh supply of stacked cigarettes.

The programming systems which control the admission and evacuation of filled cages from the magazines 74 and 75 via storing conveyors 901, 902 and 905, 906 are analogous to the programming system 81 of FIG. 9. The programming systems which control the admission and evacuation of empty cages from the magazines 70, 71 and 72 are analogous to the system 81 with the important exception that the detectors (corresponding to the detector 920 shown in FIG. 9) send signals only upon detection of empty cages. Such empty cages are then diverted into the corresponding magazine 70, 71 or 72 and the same magazine discharges an empty cage onto the feed conveyor 5, 6 or 7, and more particularly onto that portion of the respective feed conveyor which causes the thus discharged empty cages to advance directly to the nearest cigarette machine. In FIG. 2a, the numeral 84 denotes the programming system for the magazine 70 and storing conveyors 911, 912, and the numeral 85 denotes the blocking device for the magazine 70.

In the production line which is shown in FIGS. 2a and 2b, a filled cage can be circulated in the following manner: Assuming that a filled cage has advanced beyond the last cigarette machine 31 and is on its way toward the switch 762 of the storing conveyor 910. If the detector 920 of the programming system 81 does not produce a signal which causes the filled cage to leave the conveyor 5 and to enter the storing conveyor 910, such filled cage advances past the outlet 932 of the storing conveyor 909 and travels past the packing machines 50, 49, etc. If it is removed by the diverting conveyor of one of the packing machines 41-50, the filled cage is converted into an empty cage and returns onto the feed conveyor 5. If the filled cage is not needed by the evacuating units 411, 421 . . . 501, it advances past the last packing machine 45 and approaches the switch 760 of the storing conveyor 912. If the detector of the programming system 84 detects an empty cage which travels on the auxiliary conveyor 761 and approaches the switch of the storing conveyor 911, the filled cage which approaches the switch 760 is diverted onto the storing conveyor 912 and is transferred onto the auxiliary conveyor 761 to take the place of the empty cage which was diverted into the magazine 70. The conveyor 761 entrains the thus transferred filled cage toward the switch 929 of the storing conveyor 909 and the cage is diverted into the magazine 73 in a manner as described in connection with FIG. 9. After moving in stepwise fashion and into abutment with the blocking device 82 of the magazine 73, the filled cage is ultimately returned onto the feed conveyor 5 and is advanced toward the packing machines 41-50 where it is likely to be withdrawn by one of the diverting conveyors which supply filled cages to the evacuating stations 411, 421, etc.

If a filled cage approaches the switch 760 of the storing conveyor 912 when the switch of the storing conveyor 911 is not approached by an empty cage, the switch 760 remains in its normal position and the filled cage bypasses the conveyors 912, 911 and thereupon the cigarette machines 21-40. The diverting conveyors 212, 222, etc. for the filling units 211, 221, etc. are adjusted in such a way that their detectors cause diversion of empty cages but allow all filled cages to simply continue their travel with the feed conveyor 5 and to again approach the switch 762 of the storing conveyor 910, i.e., the first storing conveyor which is located downstream of the row of cigarette machines 21-40. The filled cage might approach the switch 762 at the exact time when another filled cage approaches the switch 929 of the storing conveyor 909. The detector 920 of FIG. 9 then produces a signal which causes the shifting device to move the switch 762 to the broken-line position and the filled cage is automatically transferred from the feed conveyor 5 onto the auxiliary conveyor 761. This filled cage then advances toward the switch of the storing conveyor 908 which extends through the magazine 71 for empty cages. The filled cage bypasses this switch because the magazine 71 cannot receive filled cages and the filled cage advances with the auxiliary conveyor 761 toward the switch of the storing conveyor 906 which extends through the magazine 74 for filled cages. Thus, the filled cage is automatically diverted into the magazine 74 and, after passing through this magazine, reaches the feed conveyor 6 for the second group 3 of cigarette machines and packing machines. In the just described manner, a filled cage which is not needed by the group 3 may enter the feed conveyor 7 for the group 4 and, if not needed by the group 4, returns onto the feed conveyor 5 for the group 2. The same holds true for empty cages, i.e., an empty cage which is not needed by the cigarette machines 21-40 may be admitted onto the feed conveyor 6 for the group 3, thereupon onto the feed conveyor 7 for the group 4, and thence back onto the feed conveyor 5 for the group 2.

It will be seen that the production line of FIGS. 2a and 2b continuously removes filled cages from the auxiliary conveyor 761 and from the magazines 73-75 so that such filled cages cannot remain stored away for long periods of time. Thus, each filled cage is repeatedly delivered to the packing machines 41-50 of the group 2, to the packing machines of the group 3 or to the packing machines of the group 4. As will be readily understood upon perusal of the description of the operation of the production line shown in FIGS. 1a and 1b, the production line of FIGS. 2a and 2b also circulates filled cages in such a way that a cage coming from a magazine is preferred over a cage which has been filled more recently so that the filled cages are converted substantially in the same sequence in which they are being filled by the cigarette machines. Filled cages which have entered the magazines 73-75 are continuously replaced with more recently filled cages to make sure that the tobacco particles in the cigarettes are not subjected to excessive drying action.

When the cigarette machines are arrested, the conveyor system of the production line shown in FIGS. 2a and 2b automatically advances all of the filled cages to the packing machines which are in need of filled cages so that each filled cage is automatically converted into an empty cage. On the other hand, if the packing machines are arrested ahead of the cigarette machines, the entire conveyor system will, after a certain period of time, contain only filled cages.

In the production lines shown in FIGS. 1a-1b and 2a-2b, one or more cigarette machines and one or more packing machines may be arrested or slowed down without causing any disturbances in operatiton of the remaining machines. Such remaining machines will continue with conversion and reconversion of cages whereby the number of empty cages will rise if the cigarette machines operate at less than full capacity and/or if one or more cigarette machines are arrested due to malfunction or for other reasons. The number of filled cages will increase in response to inactivation of one or more packing machines and/or when at least one packing machine operates at less than full capacity.

If several packing machines or cigarette machines are arrested at the same time and for longer intervals, the number of filled or empty cages will decrease at a rate depending on the reduction of the combined output of the respective class of machines. A certain reduction in the number of empty or filled cages can be tolerated without affecting the operation of the machines which are still running because the various magazines invariably contain a certain number of filled or empty cages. If the number of filled or empty cages decreases considerably, the personnel in charge will preferably shut down one or more machines of the other class. For example, if six cigarette machines of the group 2 shown in FIGS. 2a and 2b are idle, the operators will preferably shut down three packing machines. This will insure that the combined output of the remaining 14 cigarette machines meets the needs of the remaining seven packing machines. Since all of the cigarette machines are assumed to turn out the same type of cigarettes, the sequence in which the packing machines are mounted, started or disconnected is of no importance. Thus, when one or more cigarette machines are idle and the number of filled cages decreases, the operators can shut down one or more packing machines without being compelled to speculate as to which of the packing machines must be shut down.

It is further clear that the aforementioned gauges and mechanical detectors therefor may be replaced by other types of gauges and detectors. For example, each detector may comprise a photoelectric cell which actually scans the interior of the cages and discriminates between cages which contain filled trays and cages whose trays are empty. Other types of detectors and indicators, too, may be used if desired.

In the above description of the production lines shown in FIGS. 1a–1b and 2a–2b, it was assumed that all cigarette machines of a production line turn out the same brand of cigarettes and that all packing machines form the same type of packs. It is clear, however, that the apparatus of our present invention is equally capable of circulating cages which contain different brands of products and that such apparatus can deliver cages containing different brands of products to different types of packing or other consuming machines. For example, the cigarette machines 21–24 of FIGS. 2a–2b can produce a brand A of cigarettes and such cigarettes are processed in the packing machines 41, 42. The remaining cigarette machines 25–40 can produce a brand B, and this brand B is packed in the machines 43–50. In order to insure that the brand A is packed only in the machines 51–52, and that the brand B is packed only in the machines 53–60, the detectors of the respective diverting conveyors must be capable of discriminating between gauges on the cages which contain different brands of cigarettes. The same holds true for the detectors which admit different brands to different magazines. The detectors which cause diversion of empty cages into the cigarette machines 21–40 can remain unchanged provided, of course, that all of the cages are constructed and dimensioned in the same way. In other words, if the production line is to produce and to process two or more brands of goods, the gauges on the cages must be of the type which can be adjusted to indicate, by their position with reference to the corresponding cages, the type of goods which are stored in the cages as well as to indicate whether or not a cage is empty. Such gauges are disclosed in our aforementioned copending application Ser. No. 501,775 to which reference may be had if necessary. As stated before, the detectors of the diverting conveyors for the packing machines are then adjusted or mounted in such a way that each thereof produces a signal only when it detects a cage whereon the position of the gauge indicates that the cage contains the desired type of goods.

A production line which turns out two or more brands of goods is preferably provided with different types of magazines each of which can accommodate only such cages which contain a certain brand of goods. Otherwise, a magazine for filled cages would contain an odd assortment of cages which are filled with brands A, B, C, etc., and, when a cage containing the brand A were needed, it could not be immediately withdrawn from such magazine. Each such special magazine is controlled by a programming system whose detector can discriminate between cages which are filled with different brands so that a magazine which is intended for temporary storage of cages containing the brand A cannot receive cages which are filled with the brand B, C, etc. The detectors of the programming systems which control entry of empty cages into the corresponding magazines may be of uniform design as long as all of the cages are constructed and dimensioned in the same way, i.e., as long as a cage which happens to be filled with brand A can be filled with the brand B, C, etc. On the other hand, if different brands are stored in different types of trays and/or cages, the detectors which initiate diversion of empty cages into certain magazines must be capable of discriminating between different types of empty cages and/or between identical cages which contain different types of trays.

As can be best seen by referring to FIGS. 2a and 2b, the machines in each of the three groups 2, 3 and 4 may be located very close to each other. Nevertheless, each machine is readily accessible to the personnel in charge. Similar observations apply to the production line which is shown in FIGS. 1a and 1b. Since the conveyor system is preferably of the overhead type and is located at such a level above the ground that a grown person can stand below the cages which are suspended on the conveyors, the operators can work on or at the machines while the cages continue to circulate. In other words, the operators can reach the machines by walking up and down, as viewed in FIGS. 1a–1b, 2a and 2b, without being hindered by the conveyors which circulate and store the cages.

Production lines of the type shown in FIGS. 1a–1b and 2a–2b are preferably idled only when all of the goods are consumed. In the embodiment of FIGS. 2a and 2b, all of the cigarettes should be packed when the machines 21–50 are halted. Whether or not the goods are also wrapped and/or tied is of lesser importance because such wrapping and tying can take place while the cigarette machines 21–40 start to turn out a fresh supply of cigarettes. In other words, at the end of a daily shift or at the end of the last shift before a weekend, all of the loose cigarettes should be removed from the production line, and this is achieved in a very simple manner by shutting down the cigarette machines ahead of the processing or consuming machines. The novel system of storing conveyors and magazines then insures that all of the unpacked cigarettes are automatically delivered to the packing machines 41–50. In some instances, a filled cage might complete one or two complete cycles before it is withdrawn by the diverting conveyor of a consuming machine, even after the cigarette machines are brought to a standstill. The diverting conveyors of the cigarette machines cannot interfere with the travel of filled cages because the detectors of such diverting conveyors react only when they discover an empty cage. The same holds true for all of the detectors which control the admission of cages into and evacuation of cages from the magazines. Thus, there is no need to adjust the programming systems when the cigarette machines are halted because, by operating in the same way as when the cigarette machines are running, the programming systems will automatically insure that all of the filled cages are converted into empty cages provided, of course, that the packaging machines 41–50 remain in operation for a period of time which is long enough to insure that such packing machines will consume the surplus output of cigarette machines.

When a daily shift is started, the cigarette machines are started ahead of the packing machines so as to pile up a supply of filled cages. When the number of filled cages in the conveyor system is sufficient, the packing machines are started signly or simultaneously, and the production line then operates in a manner as described hereinbefore. Again, there is no need to adjust the programming systems if the cigarette machines are started ahead of the packing machines because the programming systems will automatically take care of proper distribution and transportation of filled and empty cages, i.e., each filled cage is rapidly transported to that evacuating unit which happens to require a fresh supply of unpacked cigarettes.

It will be seen that a very important feature of the improved method and apparatus resides in that any fluctuation in the output of producing and/or consuming machines can be compensated for in a fully automatic way, that temporary or even longer-lasting inactivation of one or more machines cannot affect the operation of the remaining machines, and that the control systems or programming systems of the apparatus operate properly when all of the producing or consuming machines are halted. As stated before, the arrangement is preferably such that the producing machines will normally be started half an hour ahead of the consuming machines and that the producing machines are shut down half an hour ahead of the producing machines.

The method and apparatus of our invention are equally applicable to treatment of other types of goods. For example, and referring again to FIGS. 2a and 2b, the packing machines 41–50 may be considered as producing machines if the wrapping machines 51–60 are considered as constituting consuming machines. Also, the wrapping machines 51–60 are producing machines for the binding machines 61, 63, 66, 68.

It will be seen that the magazines are preferably provided in the zone between the two classes of machines. Their purpose is to feed empty or filled receptacles in the event that the producing or consuming machines do not operate at full capacity. However, and as described above, the contents of the magazines are exchanged continuously to make sure that goods which are stored in filled cages do not remain exposed for excessive periods of time. Such continuous circulation of cages is made possible by the provision of the auxiliary conveyor and of the intermediate or storing conveyors which connect the feed conveyor with the auxiliary conveyor in such a way that a filled cage can rapidly reach one of the filling units regardless of whether the filled cage happens to be located in the endless path defined by the feed conveyor, in the endless path defined by the auxiliary conveyor, or in one of the magazines.

Subdivision of machines into two or more groups is advisable when the production line (as in FIGS. 2a and 2b) comprises a very large number of producing and consuming machines. In the absence of such subdivision into groups, the feed conveyor would have to be very long so that a filled cage would be likely to travel through a considerable distance before it reaches a consuming machine which requires a fresh supply of goods. The single auxiliary conveyor 761 of FIGS. 2a and 2b insures that the surplus in one of the groups may be transferred into the conveyor system of the other group or groups.

The conveyor system of the improved apparatus will automatically transport all filled cages to the consuming machines which require a fresh supply of goods. In some instances, the filled cages will immediately proceed to the class of machinery which includes consuming machines. In certain other instances, the filled cages will pass through one or more magazines, always in such a way that a more recently filled cage takes the place of an earlier filled cage to make sure that the goods are exposed to the action of atmospheric air for a minimal length of time.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. An apparatus for supplying smokers' products and other types of goods from a first class of machinery including at least one producing machine to a second class of machinery including at least one consuming machine, comprising feed conveyor means defining a first endless path in which the goods circulate unidirectionally, said first path extending along said machines so that goods produced by said first class of machinery may be transported to and withdrawn from said path by said second class of machinery at a rate depending on the output of said consuming machine;

an auxiliary conveyor defining a second endless path in which the goods circulate unidirectionally;

a magazine for surplus goods;

a first intermediate conveyor for unidirectionally transporting surplus goods from said first path, through said magazine and into said second path, said intermediate conveyor being arranged to withdraw surplus goods from a zone of said first path which is located downstream of said second class of machinery; and a second intermediate conveyor for unidirectionally transporting surplus goods from said second path to a zone of said first path which is located upstream of said second class of machinery.

2. An apparatus for supplying smokers' products and other types of goods from a first class of machinery including a plurality of producing machines to a second class of machinery including a plurality of consuming machines whose combined requirements in normal operation of said classes of machinery at least approximate the combined output of said producing machines, said machines being arranged in a plurality of groups each of which includes producing and consuming machines, comprising feed conveyor means defining a first endless path extending along said machines so that goods produced by said first class of machinery may be transported to and withdrawn from said path by said second class of machinery at a rate depending on the output of said consuming machines, said feed conveyor means including a separate endless feed conveyor for each of said groups; an auxiliary conveyor defining a second endless path and being common to all of said groups; a magazine for surplus goods; and an intermediate conveyor for unidirectionally transporting surplus goods from one of said paths, through said magazine and into the other path.

3. An apparatus for supplying smokers' products and other types of goods which are transported in receptacles from a first class of machinery including a plurality of producing machines to a second class of machinery including a plurality of consuming machines whose combined requirements in normal operation of said classes of machinery at least approximate the combined output of said producing machines, said producing machines having filling units for converting empty receptacles into filled receptacles and said consuming machines having evacuating units for converting filled receptacles into empty receptacles, comprising feed conveyor means defining a first endless path extending along said machines so that receptacles containing goods produced by said first class of machinery may be transported to and withdrawn from said path by said second class of machinery at a rate depending on the output of said consuming machined; an auxiliary conveyor defining a second endless path; a magazine arranged to accommodate a predetermined number of filled receptacles; a first intermediate conveyor for unidirectionally transporting filled receptacles from one of said paths, through said magazine and into the other path; and a second intermediate conveyor connecting said paths and arranged to transfer receptacles from said other path into said one path.

4. An apparatus as set forth in claim 3, wherein said first intermediate conveyor comprises an inlet including a switch movable to and from an operative position in which a filled receptacle is diverted from said second path and enters said magazine and wherein said second intermediate conveyor comprises an inlet including a switch movable to and from an operative position in which a receptacle is diverted from said first path, and further comprising blocking means for normally preventing removal of filled receptacles from said magazine, and programming means for controlling said blocking means and said switches in such a way that said blocking means releases a filled receptacle for entry into said first path to take the place of a receptacle which is diverted by the switch of said second intermediate conveyor, said programming means being further arranged to move the switch of said first intermediate conveyor into operative position in response to detection of a filled receptacle which approaches said last named switch while moving in said second path.

5. An apparatus as set forth in claim 3, further comprising a second magazine arranged to accommodate a predetermined maximum number of empty receptacles, said second intermediate conveyor being arranged to transport empty receptacles from said other path into said second magazine and to transport empty receptacles from said second magazine into said one path.

6. An apparatus as set forth in claim 5, further comprising a third intermediate conveyor connecting said first and second paths, each of said intermediate conveyors having an inlet including a switch movable to and from an operative position in which the respective switch diverts a magazine from one of said paths, and further comprising blocking means for normally preventing removal of empty receptacles from said second magazine and programming means for regulating the operation of said switches and of said blocking means in such a way that said blocking means releases from said second magazine an empty receptacle for entry into said first path to take the place of a receptacle which is diverted from the first path by the switch of said third intermediate conveyor and that said third intermediate conveyor transfers into said second path a receptacle to take the place of an empty receptacle which has been diverted into said second machine by the switch of said second intermediate conveyor.

7. An apparatus for supplying smokers' products and other types of goods which are transported in receptacles provided with adjustable gauge means for indicating the condition of the respective receptacles from a first class of machinery including at least one producing machine having a filling unit wherein empty receptacles are converted into filled receptacles to a second class of machinery including at least one consuming machine having an evacuating unit wherein filled receptacles are converted into empty receptacles, comprising feed conveyor means defining a first endless path extending along said machines so that receptacles filled by said filling unit may be transported to and withdrawn from said path by said second class of machinery at a rate depending on the output of said consuming machine; an auxiliary conveyor defining a second endless path; a magazine for surplus receptacles; and intermediate conveyor for unidirectionally transporting surplus receptacles from one of said paths, through said magazine and into the other path; and diverting conveyors for withdrawing receptacles from said first path and for supplying the thus withdrawn receptacles to the respective machines, each of said diverting conveyors comprising detector means arranged to discriminate between the gauge means of filled and empty receptacles so that said producing and consuming machines respectively receive empty and filled receptacles only.

8. An apparatus as set forth in claim 7, wherein each of said machines comprises resetting means for said gauge means so that the position of the gauge means on each converted receptacle again reflects the condition of the respective receptacle.

9. An apparatus as set forth in claim 7, wherein said producing and consuming machines are respectively arranged to produce and to consume different brands of goods and wherein said gauge means are adjustable between more than two positions so as to indicate the condition of the respective receptacles and the brand of goods in a filled receptacle.

10. An apparatus for supplying smokers' products or other types of goods which are transported in receptacles from a first class of machinery including at least one producing machine having a filling unit wherein empty receptacles are converted into filled receptacles to a second class of machinery including at least one consuming machine having an evacuating unit wherein filled receptacles are converted into empty receptacles, comprising feed conveyor means defining a first endless path extending along said machines so that receptacles filled by said filling unit may be transported to and withdrawn from said path by said second class of machinery at a rate depending on the output of said consuming machine; an auxiliary conveyor defining a second endless path; a magazine for surplus receptacles; a first intermediate conveyor for unidirectionally transporting surplus receptacles from one of said paths, through said magazine and into the other path; three additional intermediate conveyors for transferring receptacles between said paths, two of said intermediate conveyors being arranged to transfer receptacles from said first path into said second path and the remaining two intermediate conveyors being arranged to transfer receptacles from said second path into said first path; and a second magazine arranged to accommodate a predetermined maximum number of empty receptacles, one of said additional intermediate conveyors being arranged to transfer empty receptacles from said one path, through said second magazine and into said other path.

11. An apparatus for supplying smokers' products or other types of goods which are transported in receptacles from a first class of machinery including at least one producing machine having a filling unit wherein empty receptacles are converted into filled receptacles to a second class of machinery including at least one consuming machine having an evacuating unit wherein filled receptacles are converted into empty receptacles, comprising feed conveyor means defining a first endless path extending along said machines so that receptacles filled by said filling unit may be transported to and withdrawn from said path by said second class of machinery at a rate depending on the output of said consuming machine; an auxiliary conveyor defining a second endless path; a first magazine for surplus receptacles; a first intermediate conveyor for unidirectionally transporting surplus receptacles from one of said paths, through said magazine and into the other path; three additional intermediate conveyors for transferring receptacles between said paths, two of said intermediate conveyors being arranged to transfer receptacles from said first path into said second path and the remaining two intermediate conveyors being arranged to transfer receptacles from said second path into said first path; and a further magazine for each of said additional intermediate conveyors, two of said magazines being arranged to accommodate predetermined maximum numbers of filled receptacles and the remaining two magazines being arranged to accommodate predetermined maximum numbers of empty receptacles.

12. An apparatus as set forth in claim 11 wherein two of said intermediate conveyors are arranged to respectively transport filled and empty receptacles from said first path, through the corresponding magazines and into said second path and wherein the remaining two intermediate conveyors are respectively arranged to transport filled and empty receptacles from said second path, through the corresponding magazines and into said first path.

13. An apparatus for supplying smokers' products or other types of goods which are transported in receptacles from a first class of machinery including at least one producing machine having a filling unit wherein empty receptacles are converted into filled receptacles to a second class of machinery including at least one consuming machine having an evacuating unit wherein filled receptacles are converted into empty receptacles, comprising feed conveyor means defining a first endless path extending along said machines so that receptacles filled by said filling unit may be transported to and withdrawn from said path by said second class of machinery at a rate depending on the output of said consuming machine; an auxiliary conveyor defining a second endless path; a first magazine arranged to accommodate a predetermined maximum number of filled receptacles; a first intermediate conveyor for unidirectionally transporting surplus filled receptacles from one of said paths, through said first magazine and into the other path; a second magazine arranged to accommodate a predetermined maximum number of empty receptacles; and a second intermediate conveyor for unidirectionally transporting empty receptacles from said second path, through said second magazine and into said first path, said second intermediate conveyor having an outlet discharging into said first path upstream of said first class of machinery.

14. An apparatus as set forth in claim 13, further comprising a third intermediate conveyor for transporting empty receptacles from said first path into said second path, said third intermediate conveyor having an inlet located downstream of said first class of machinery and an outlet discharging into said second path, said second intermediate conveyor having an inlet including a switch movable to and from an operative position in which the switch diverts an empty receptacle from said second path into said second magazine and shifting means arranged to detect empty receptacles in said second path and to effect movement of said switch to operative position in response to such detection when said second magazine accommodates less than said predetermined maximum number of empty receptacles.

15. An apparatus as set forth in claim 14, further comprising blocking means for normally preventing removal of receptacles from said magazines, and actuating means for controlling said blocking means, each of said actuating means comprising detector means one of which is arranged to scan said auxiliary conveyor for availability of space for filled receptacles in said second path and the other of which is arranged to scan said feed conveyor for availability of space for empty receptacles in said first path, said actuating means being arranged to effect release of receptacles from the corresponding magazines in response to detection of available space in the respective paths.

16. An apparatus for supplying receptacles to two classes of machinery one of which includes at least one machine where receptacles of a first type are converted into receptacles of a second type and the other of which includes at least one machine where receptacles of said second type are reconverted into receptacles of said first type, comprising a feed conveyor for circulating a supply of both types of receptacles in an endless path extending along said machines; a diverting conveyor provided for each of said machines for withdrawing receptacles from said endless path at a rate determined by the output of the respective machine and for returning converted receptacles into said endless path; and a second conveyor for one type of receptacles, said second conveyor comprising an inlet and an outlet respectively adjacent to longitudinally spaced portions of said endless path, and means for advancing surplus receptacles of said one type from said endless path and in a direction from said inlet toward said outlet when the supply of said one type of receptacles in said endless path increases in response to a reduction in the output of the respective class of machines.

17. An apparatus as set forth in claim 16, wherein said second conveyor comprises an auxiliary conveyor defining a second endless path and two intermediate conveyors connecting said intermediate conveyor with said feed conveyor.

18. An apparatus as set forth in claim 17, further comprising a magazine for said one type of receptacles, one of said intermediate conveyors extending through said magazine and being arranged to introduce into the magazine fresh receptacles from one of said endless paths and to deliver a receptacle from said magazine into the other endless path in exchange for each freshly introduced receptacle.

19. A method of operating a production line for smokers' articles and other types of goods wherein receptacles are circulated between first and second classes of machines in one of which empty receptacles receive goods and are thus converted into filled receptacles and in the other of which filled receptacles are evacuated and are thus reconverted into empty receptacles, comprising the steps of circulating a first supply of filled and empty receptacles in a first endless path which extends along said machines; diverting from said path receptacles at a rate depending on the output of said machines and supplying the thus diverted receptacles to the machines requiring them; returning converted receptacles into said path; circulating a second supply of filled and empty receptacles in a second endless path; transferring filled and empty receptacles between said paths in dependency on changes in the output of said machines and in such a way that filled receptacles are converted substantially in the sequence in which they are converted by said one class of machines; and arresting said one class of machines ahead of said other class so that the remaining filled receptacles are converted into empty receptacles not later than at the time of complete shutdown of said production line.

20. A method of operating a production line for smoker's articles and other types of goods wherein receptacles are circulated between first and second classes of machines in one of which empty receptacles receive goods and are thus converted into filled receptacles and in the other of which filled receptacles are evacuated and are thus reconverted into empty receptacles, comprising the steps of circulating a supply of empty receptacles in a first endless path which extends along said machines; starting said one class of machines to convert a number of empty receptacle into filled receptacles; circulating a second supply of empty receptacles in a second endless path; transferring some filled receptacles into said second path in exchange for an equal number of empty receptacles; starting said other class of machines; diverting from said one path filled receptacles to said other class of machines at a rate depending on the output of such machines; returning converted receptacles from said other class of machines into said first path; and continuously circulating receptacles in and between said first and second paths in such sequence that filled receptacles are diverted to said other class of machines substantially in the same sequence in which they are converted in said one class of machines.

21. A method of operating a production line for smokers' articles and other types of goods wherein receptacles are circulated between first and second classes of machines in one of which empty receptacles receive predetermined quantities of goods and are thus converted into filled receptacles and in the other of which filled receptacles are relieved of goods and are thus reconverted into empty receptacles, comprising the steps of circulating a first supply of filled and empty receptacles in a first endless path which extends along said machines; diverting from said path filled and empty receptacles at a rate depending on the output of the respective machines and delivering the thus diverted receptacles to the machines requiring them; returning converted receptacles from said machines into said path; circulating a second supply of filled and empty receptacles in a second endless path; accumulating separate rows of filled and empty receptacles between said paths; unidirectionally transferring receptacles from one of said paths to said rows; and unidirectionally transferring receptacles from said rows into the other path.

References Cited

UNITED STATES PATENTS

| | | | |
|---|---|---|---|
| 3,200,766 | 8/1965 | Gorjanc | 198—38 |
| 3,260,349 | 7/1966 | Vandermeer | 198—38 |

ROBERT G. SHERIDAN, *Primary Examiner.*